United States Patent
Coifman et al.

(10) Patent No.: US 9,786,275 B2
(45) Date of Patent: Oct. 10, 2017

(54) SYSTEM AND METHOD FOR ANOMALY DETECTION AND EXTRACTION

(71) Applicant: Yale University, New Haven, CT (US)

(72) Inventors: Ronald R. Coifman, North Haven, CT (US); Ali Haddad, East Haven, CT (US); Ronen Talmon, New Haven, CT (US)

(73) Assignee: YALE UNIVERSITY, New Haven, CT (US)

( * ) Notice: Subject to any disclaimer, the term of this patent is extended or adjusted under 35 U.S.C. 154(b) by 292 days.

(21) Appl. No.: 14/385,670

(22) PCT Filed: Mar. 15, 2013

(86) PCT No.: PCT/US2013/032248
§ 371 (c)(1),
(2) Date: Sep. 16, 2014

(87) PCT Pub. No.: WO2013/138747
PCT Pub. Date: Sep. 19, 2013

(65) Prior Publication Data
US 2015/0046156 A1  Feb. 12, 2015

Related U.S. Application Data

(60) Provisional application No. 61/611,778, filed on Mar. 16, 2012.

(51) Int. Cl.
*G10L 15/20* (2006.01)
*G10L 21/0208* (2013.01)
(Continued)

(52) U.S. Cl.
CPC ............ *G10L 15/20* (2013.01); *G10L 15/063* (2013.01); *G10L 21/0208* (2013.01); *G10L 19/025* (2013.01); *H04R 2225/43* (2013.01)

(58) Field of Classification Search
CPC ..... G10L 21/00; G10L 21/02; G10L 21/0208; G10L 21/0216; G10L 21/0232;
(Continued)

(56) References Cited

U.S. PATENT DOCUMENTS 7,558,636 B2    7/2009   Arndt et al.
7,693,292 B1 *  4/2010   Gross ................ G10K 11/1782
                                                381/71.12
(Continued)

FOREIGN PATENT DOCUMENTS

EP    1775719      4/2007
WO    2010/002266  1/2010
WO    2011/057971  5/2011

OTHER PUBLICATIONS

Talmon, Ronen, Israel Cohen, and Sharon Gannot. "Transient noise reduction using nonlocal diffusion filters." IEEE Transactions on Audio, Speech, and Language Processing 19.6 (2011): 1584-1599.*
(Continued)

*Primary Examiner* — Paras D Shah
(74) *Attorney, Agent, or Firm* — Riverside Law LLP

(57) ABSTRACT

The present invention relates to a system for suppressing transient interference from a signal. The system includes a modeling system, wherein the modeling system constructs a model of transient interference from a first signal, and a filtering system, wherein the filtering system suppresses transient interference from a second signal by applying the model to the second signal.

14 Claims, 10 Drawing Sheets

(51) Int. Cl.
*G10L 15/06* (2013.01)
*G10L 19/025* (2013.01)

(58) Field of Classification Search
CPC . G10L 21/0272; G10L 21/0364; G10L 25/00; G10K 11/00
USPC .................. 704/226–228; 381/71.1, 94.1
See application file for complete search history.

(56) References Cited

U.S. PATENT DOCUMENTS

| | | | |
|---|---|---|---|
| 7,869,994 | B2 | 1/2011 | Nongpiur et al. |
| 8,073,689 | B2 | 12/2011 | Hetherington et al. |
| 2002/0084782 | A1 | 7/2002 | Guthrie |
| 2006/0036353 | A1 | 2/2006 | Wintermantel |
| 2006/0100868 | A1* | 5/2006 | Hetherington ...... G10L 21/0208 704/226 |
| 2006/0116873 | A1* | 6/2006 | Hetherington ...... G10L 21/0208 704/226 |
| 2007/0055508 | A1* | 3/2007 | Zhao .................. G10L 21/0216 704/226 |
| 2008/0064357 | A1* | 3/2008 | Gozen .................. H04B 1/1027 455/296 |
| 2008/0243497 | A1* | 10/2008 | Tashev ................ G10L 21/0208 704/227 |
| 2009/0132245 | A1* | 5/2009 | Wilson ................ G10L 21/0272 704/226 |
| 2011/0218952 | A1* | 9/2011 | Mitchell ................. G10L 17/26 706/12 |
| 2011/0268301 | A1* | 11/2011 | Nielsen ................... G10L 21/02 381/321 |
| 2012/0076315 | A1 | 3/2012 | Hetherington et al. |
| 2013/0040694 | A1* | 2/2013 | Forutanpour ....... G10L 21/0216 455/550.1 |
| 2013/0132076 | A1* | 5/2013 | Yang .................. G10L 21/0208 704/219 |

OTHER PUBLICATIONS

Cohen, "Noise Spectrum Estimation in Adverse Environments: Improved Minima Controlled Recursive Averaging", IEEE Transactions on Speech and Audio Processing, vol. 11, No. 5, pp. 466-475, Sep. 2003.

Cohen et al., "Noise Estimation by Minima Controlled Recursive Averaging for Robust Speech Enhancement", IEEE Signal Processing Letters, vol. 9, No. 1, pp. 12-15, Jan. 2002.

Cohen, et al., "Speech Enhancement for Non-Stationary Noise Environments", Signal Processing 81 (2001), pp. 2403-2418.

Mohammadiha et al. "A New Linear MMSE Filter for Single Channel Speech Enhancement Based on Nonnegative Matrix Factorization", IEEE Workshop on Applications of Signal Processing to Audio and Acoustics, Oct. 16-19, 2011, pp. 45-48.

Wilson et al., "Speech Denoising Using Nonnegative Matrix Factorization with Priors" Mitsubishi Electric Research Laboratories, Aug. 2008.

Smaragdis, "Convolutive Speech Bases and Their Application to Supervised Speech Separation", IEEE Transactions on Audio, Speech, and Language Processing, vol. 15, No. 1, pp. 1-12, Jan. 2007.

Coifman et al., "Diffusion Maps", Appl. Comput. Harmon. Anal. 21 (2006), pp. 5-30.

Talmon, et al. "Clustering and Suppression of Transient Noise in Speech Signals Using Diffusion Maps", ICASSP 2011, pp. 5084-5087.

Talmon et al., "Single-Channel Transient Interface Suppression With Diffusion Maps," IEEE Transactions on Audio, Speech, and Language Processing, vol. 21, No. 1, pp. 132-144, Jan. 2013.

Singer et al., "Diffusion Interpretation of Nonlocal Neighborhood Filters for Signal Denoising" SIAM J. Imaging Sciences, vol. 2, No. 1, pp. 118-139.

Szlam et al. "Regularization on Graphs with Function-adapted Diffusion Processes", Journal of Machine Learning Research 9, (2008) pp. 1711-1739.

Mahmoudi et al. "Fast Image and Video Denoising via Nonlocal Means of Similar Neighborhoods", IEEE Signal Processing Letters, vol. 12, No. 12, pp. 839-842, Dec. 2005.

Buades et al. "A Review of Image Denoising Algorithms, with a New One", Multiscale Model Simul. vol. 4, No. 2, pp. 490-530.

Barash, "A Fundamental Relationship between Bilateral Filtering, Adaptive Smoothing, and the Nonlinear Diffusion Equation", IEEE Transactions on Pattern Analysis and Machine Intelligence, vol. 24, No. 6, pp. 844-847, Jun. 2002.

Talmon et al., "Speech Enhancement in Transient Noise Environment Using Diffusion Filtering", Proc. 35$^{th}$ IEEE Internet Conf. Acoust. Speech and Signal. Process. (ICASSP-2010), Dallas, Texas Mar. 2010, pp. 4782-4785.

Talmon et al., "Transient Noise Reduction Using Nonlocal Diffusion Filters" IEEE Transactions on Audio, Speech, and Language Processing, vol. 19, No. 6, pp. 1584-1599, Aug. 2011.

* cited by examiner

SYSTEM AND METHOD FOR ANOMALY DETECTION AND EXTRACTION

CROSS-REFERENCE TO RELATED APPLICATIONS

This application is the U.S. national phase application filed under 35 U.S.C. §371 claiming benefit to International Patent Application No. PCT/US13/032248, filed on Mar. 15, 2013, which is entitled to priority under 35 U.S.C. §119(a)-(d) to U.S. provisional application no. 61/611,778, filed Mar. 16, 2012, each of which application is hereby incorporated herein by reference in its entirety.

BACKGROUND OF THE INVENTION

Transients, or sounds such as keyboard typing and door knocking, often arise as an interference in everyday applications involving audio signals, including hearing aids, hands-free accessories, mobile phones, and conference-room devices. Typically, these transients consist of an initial peak followed by decaying short-duration oscillations of length ranging from 10 ms to 50 ms. Unfortunately, the wide spread assumption of stationary noise poses a major limitation on traditional speech enhancement algorithms. In particular, it makes them inadequate in transient interference environments, as transients are characterized by a sudden burst of sound. Current speech enhancement algorithms fail to deal with transient interferences, since their noise estimation components are not designed to track the rapid variations characterizing such transients.

An algorithm has previously been proposed (Talmon, et al., 2011, *IEEE Transaction on Audio, Speech and Language Processing*, 19(6):1584-1599; Talmon, et al., 2010, *Proc. 35th IEEE Internet Conf. Acoust. Speech and Signal Process.* (ICASSP-2010), Dallas, Tex., March 2010) that infers the geometric structure of the transient interference using nonlocal (NL) diffusion filtering (L. P. Yaroslayski, *Digital Picture Processing*, Springer-Verlag, Berlin, 1985; Barash, 2002, *IEEE Transactions on Pattern Analysis and Machine Intelligence*, 24:844-847; Buades, et al., 2005, *Multiscale Model. Simul.*, 4:490-530; Mahmoudi and Sapiro, 2005, *IEEE Signal Processing Letters* 12:839-842; Szlam, et al., 2008, *J. Mach. Learn. Res* 9:1711-1739; Singer, et al., 2009, *SIAM Journal Imaging Sciences*, 2(1):118-139). The key idea was to exploit the intrinsic transient structure, instead of relying on estimates of noise statistics. It was noted that a distinct pattern appears multiple times. Specifically, the locations of the repeating pattern were implicitly identified, and the transient interference was extracted by averaging over all these instances. This work was improved and extended to support a wider variety of transient interferences (Talmon, et al., 2011, *IEEE Trans. Audio, Speech Lang. Process.* 21(1):132-144; Talmon, et al., *Proc. 36th IEEE Internet Conf Acoust. Speech and Signal Process.* (ICASSP-2011), Prague, Czech Republic, May 2011). A robust approach to distinguish between transients and speech was employed based on the observation that speech components are slowly varying with respect to transient interferences, just as pseudo-stationary noise is slowly varying with respect to speech. In addition, a manifold learning approach termed diffusion maps was utilized to compute a robust intrinsic metric for comparison (Coifman 2006, *Appl. Comput. Harmon. Anal.*, 21:5-30). It enabled the clustering of different transient interference types, and when incorporated into the NL filter, it provided a better affinity metric for averaging over transient instances.

Recently several supervised speech enhancement algorithms, which rely on the prior knowledge of the typical interference patterns, have been proposed (Smaragdis, 2007, *IEEE Tran. on Audio, Speech and Language Processing*, 14(1):1-12; Wilson, et al., 2008, *Proc. 33th IEEE Internet Conf. Acoust. Speech and Signal Process.* (ICASSP-2008), Las Vegas, Nev., 14:4029-4032; Mohammadiha, et al., 2011, *Proc. IEEE Workshop on Applications of Signal Processing to Audio and Acoustics* pg. 45-48). In these algorithms, nonnegative matrix factorization (NMF) is employed to compute a basis for the interferences, which is then utilized to enhance the speech and suppress the noise. However, these algorithms suffer from several limitations. They require training recordings of both the interference and the speech (Wilson, et al., 2008, *Proc. 33th IEEE Internet Conf. Acoust. Speech and Signal Process.* (ICASSP-2008), Las Vegas, Nev., 14:4029-4032), which makes the algorithms speaker-dependent. In addition, the application of NMF is required for every new measurement and its computational burden is high. Finally, when applied to enhance speech and suppress noise (Mohammadiha, et al., 2011, *Proc. IEEE Workshop on Applications of Signal Processing to Audio and Acoustics* pg. 45-48), a temporal smoothing is applied which makes the algorithm inadequate for transient interferences.

Additionally, prior art systems for reducing or suppressing transients in an audio signal are described in the patent literature. For example, EP 1775719 describes a voice enhancement system for suppressing transient road noise; U.S. Pat. No. 7,869,994 describes a transient noise removal system using wavelets; and US 2012/0076315 describes a system for repetitive transient noise removal. Further, some patent literature discloses systems or methods for removing or reducing noise produced by keyboards, or another user-operated device, from an audio signal. For example, EP 2294697 describes a method for reducing keyboard noise in conferencing equipment (also published as U.S. Pat. No. 8,295,502), and EP 2494550 describes a method for suppressing noise in an audio signal created by a user operating a computer. However, the methods in the above disclosures are based on defining a model of potential transients or noise using information external to the noise-containing audio signal. For example, the prior art methods may create a model using information from previously analyzed signals that provide general characterizations of potential transients, or these methods may use information external to the audio signal, such as identifying noise by determining the timing of keystrokes or other user activity.

Thus, there is a need in the art for a system and method of transient interference suppression for providing accurate and efficient speech enhancement, particularly when real-time online processing is desired. The present invention satisfies this need.

SUMMARY OF THE INVENTION

A method of suppressing transient interference from a signal is described. The method includes the steps of obtaining a training recording of a transient, graphing the structure of the transient, defining a filter from the graph, and suppressing the transient from the signal by applying the filter. In one embodiment, the method further includes computing a training set $\{\overline{\lambda}_r(l)\}_{l=1}^{M}$ of $\overline{M}$ spectral variance feature vectors. In another embodiment, the method further includes obtaining an initial measurement and computing a set $\{\lambda_y(1)\}_{l=1}^M$ of M spectral variance feature vectors. In another embodiment, the at least one local model is built according to $$P_i(\lambda_y(l)) = \bar{\eta}_i + \sum_{j=1}^{L} \langle \log(\lambda_y(l)) - \bar{\eta}_i, \bar{v}_{i,j} \rangle \bar{v}_{i,j}. \quad (13)$$

In another embodiment, the local filters are defined according to $$d_i(\lambda_y(l), \lambda_y(l')) = \|P_i(\lambda_y(l)) - P_i(\lambda_y(l'))\| \quad (14).$$

In another embodiment, the method further includes computing a non-symmetric kernel matrix. In another embodiment, the non-symmetric kernel matrix is W of size M×$\bar{M}$ according to $$W_{l,\bar{l}} = \exp\left\{-\frac{\|\log(\lambda_y(l)) - \log(\bar{\lambda}_t(\bar{l})) - \eta\|^2}{2\sigma^2}\right\} \times \exp\left\{-\frac{d_i^2(\lambda_y(l), \bar{\lambda}_t(\bar{l}))}{2\bar{\sigma}^2}\right\}. \quad (15)$$

In another embodiment, the method further includes constructing a transition matrix. In another embodiment, the transition matrix is A of size M×$\bar{M}$. In another embodiment, the method further includes computing symmetric kernels $\bar{K}$ and K. In another embodiment, the method further includes obtaining the eigenvalue decomposition $\{\mu_j, \phi_j\}_j$ and $\{\mu_j, \psi_j\}_j$ of kernels $\bar{K}$ and K, respectively, by computing the SVD of A. In another embodiment, the method further includes obtaining a new time frame of the observable signal and computing a corresponding new feature vector $\lambda_y(l')$. In another embodiment, the method further includes computing the affinity of the new observation vector to the training vectors according to $$a_{l'}(\bar{l}) = \quad (17)$$

$$\frac{1}{d_{l'}} \exp\left\{-\frac{\|\log(\lambda_y(l')) - \log(\bar{\lambda}_t(\bar{l})) - \eta\|^2}{2\sigma^2}\right\} \times \exp\left\{-\frac{d_i^2(\lambda_y(l'), \bar{\lambda}_t(\bar{l}))}{2\bar{\sigma}^2}\right\}.$$

In another embodiment, the method further includes extending the eigenvectors to the new frame according to $$\psi_j(l') = \frac{1}{\sqrt{\mu_j}} a_{l'}^T \varphi_j. \quad (16)$$

In another embodiment, the filter corresponds to the new frame according to $$\hat{\lambda}_t(l') = \lambda_y^T \sum_{j=0}^{\ell} \mu_j \psi_j(l') \psi_j. \quad (18)$$

using the extended vector.

In another embodiment, the method further includes obtaining an estimate of the spectral variance for the transient interference $\hat{\lambda}_t(l')$. In another embodiment, the method further includes computing the optimal gain of the OM-LSA based on $\hat{\lambda}_t(l')$ and employing it on the new time frame to enhance the signal.

Also described is a system for suppressing transient interference from a signal. The system includes a modeling system, wherein said modeling system constructs a model of transient interference from a first signal, and a filtering system, wherein said filtering system suppresses transient interference from a second signal by applying said model to said second signal. In one embodiment, the system further includes a detection system, wherein said detection system constructs an extended model from said model of transient interference based on data from said second signal. In another embodiment, the model of transient interference is constructed substantially simultaneously with receiving said first signal. In another embodiment, the first signal and said second signal are the same signal. The

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

FIG. 1, comprising FIG. 1A depicts a clean transient (door knock) event, and FIG. 1B depicts the estimated transient (door knock) event.

FIG. 2, comprising FIG. 2A depicts a noisy signal with 7 key strokes, FIG. 2B depicts enhanced speech with suppressed keyboard typing, FIG. 2C depicts noisy signal with 4 events of household interferences, FIG. 2D depicts enhanced speech with suppressed household interferences, FIG. 2E depicts noisy signal with a door knock, and FIG. 2F depicts enhanced speech with suppressed door knocks.

DETAILED DESCRIPTION

Figure 1A:
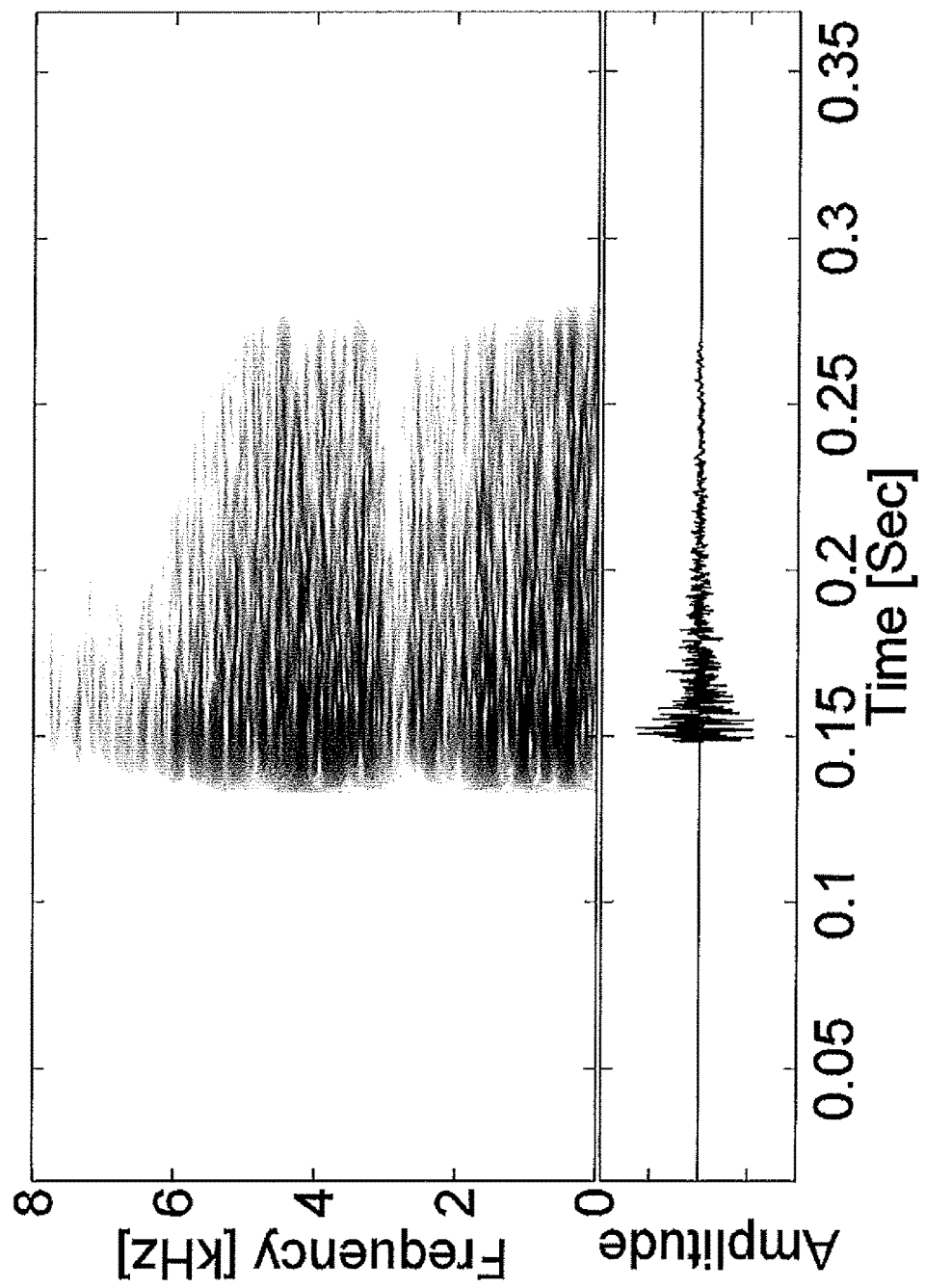
FIGS. 1A and 1B, depicts transient waveforms and spectrograms.

As contemplated herein, the present invention relates to a supervised, graph-based framework for sequential processing and suppression of transient interference. Transients typically consist of an initial peak followed by decaying short-duration oscillations. In one embodiment, the present invention includes a system and method of graph construction using a noisy speech signal and training recordings of typical transients. As described and demonstrated herein, the present invention captures the transient interference structure, which may emerge from the construction of the graph. The graph parameterization is then viewed as a data-driven model of the transients and utilized to define a filter that extracts the transients from noisy speech measurements. Unlike existing transient interference suppression studies, the graph of the present invention is constructed in advance from training recordings. Then, the graph is extended to newly acquired measurements, providing a sequential filtering framework of noisy speech.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, or ±5%, or ±1%, or ±0.1% from the specified value, as such variations are appropriate.

The term "transients," as used herein, refers to short-term statistical anomalies, relative to the desired harmonic signal, in the power spectrum domain. In audio signals, transients are short-term abrupt interferences, typically of a length ranging from 10 ms to 50 ms, that appear in arbitrary random unknown locations in time during the recording, e.g. keyboard strokes and various knocks.

The term "interference," as used herein, refers to any undesired signal, e.g. transients, that corrupts the signal of interest, e.g., speech, in a recording.

The term "kernel," as used herein, refers to a mathematical formulation of the connections between objects in a graph or a network.

The term "graph," as used herein, refers to an object that consists of two types of elements: nodes and edges. The nodes may represent various objects, e.g., samples of an audio recording, and the edges connect pairs of nodes and represent the pairwise similarities. The graph is a full network of similarity connections between recordings. Accordingly, the word "graph" may be used as an abbreviation to this network model.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

The present invention provides a system and method for a supervised, graph-based framework for sequential processing and suppression of transient interference, including a graph construction relative to a measured signal and training recordings. As contemplated herein, the graph captures the underlying structure of the training data, which represents some or all the variations of a certain signal of interest. The graph parameterization is then viewed as a data-driven model of the signal of interest and utilized to define a filter that extracts this signal from the measurement. The construction of the graph is based on an affinity kernel between the measurement and the training recordings. In certain embodiments, the present invention may rely on a specially-adapted metric based on local models of the signal of interest obtained from the training data.

Application of the present invention to the task of transient interference suppression provides accurate and efficient speech enhancement. Common speech enhancement algorithms fail to deal with transient interferences since their noise estimation component is not designed to track the rapid variations characterizing transients. The present invention provides an estimation of the spectral variance of the transient interference. Then, the optimally modified log-spectral amplitude (OM-LSA) estimator (Cohen and Berdugo, 2001, *Signal Processing*, 81:2403-2418; Cohen and Berdugo, 2002, *IEEE Signal Process. Let.*, 9(1):12-15), which is a single-channel speech enhancement algorithm, is employed to enhance the speech based on the estimate of the transient signal spectral variance. In this setting, the training recordings include typical transient interferences. Based on training recordings of the transient signal, the graph enables the accurate capture the structure of the transients. Then, the graph-based filter extracts it from the noisy speech and provides an accurate spectral variance estimate. Unlike previous studies (Talmon, et al., 2011, *IEEE Transaction on Audio, Speech and Language Processing*, 19(6):1584-1599; Talmon, et al., 2011, *IEEE Trans. Audio, Speech Lang. Process.* 21(1): 132-144) that infer the geometric structure of the transients from the noisy signal and employ batch processing, the graph of the present invention is constructed in advance from training recordings and is further extended to new measurements in a sequential filtering framework of the noisy signal. Accordingly, the present invention provides an online learning and filtering framework for high-dimensional datasets based on reference sets. In one embodiment, the invention includes an online method to build an intrinsic model and exploit it for signal filtering. This model may initially be obtained via a construction of a network of associates that rely on local model estimates of the reference set. Incoming new data points are then sequentially added into the network based on a series of comparisons to the predefined reference points. The obtained intrinsic model reveals the underlying parameterization of the data and enables the system to define intrinsic filters. These filters have the ability to detect and extract (or suppress) anomalies that stand out from the model. The present invention may be particularly suitable for applications such as (without limitation), cleaning audio and speech signals, diagnostics for machinery such as pumps, engines and compressors, and diagnostics based on medical time series or images, such as an MRI of the heart or mammography. As contemplated herein, the building of a graph or a network is based on a reference set instead of an entire set. The construction of the graph may rely on previously acquired local models of the data. The system and method may aggregate the local models into a global intrinsic model and provide a unified filtering framework. Accordingly, the metric that is used to build the graph is locally defined, and not global. The present invention also provides a general method to build and extendable model that is adapted for streaming data. This is a highly unique feature, and unlike the existing methods that adapted to batch processing. The extendable intrinsic modeling of the present invention is especially suitable for applications where real-time online processing is desired or required.

Figure 3:
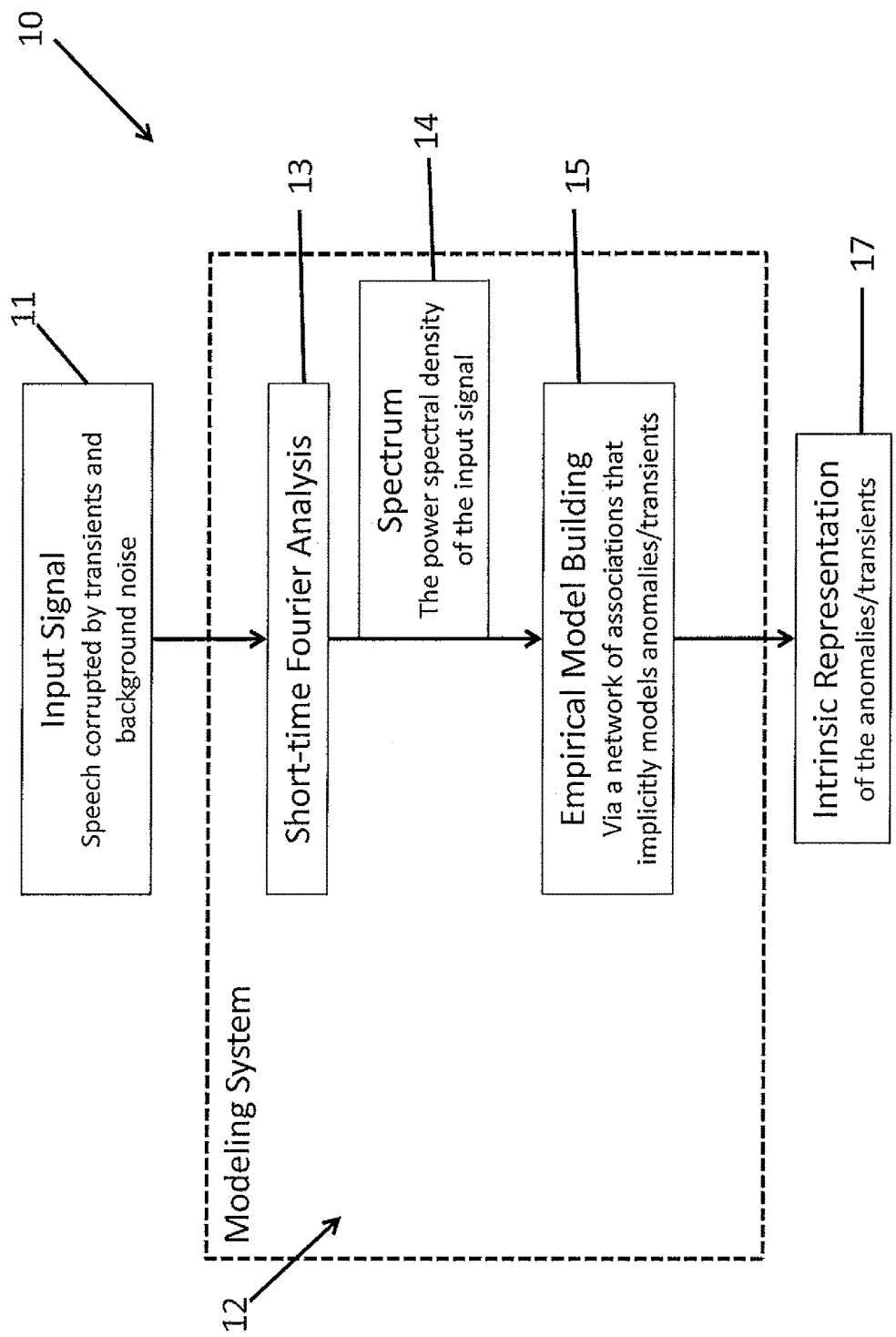
FIG. 3 is a flowchart of an exemplary embodiment of the training stage, comprising a modeling system, of the present invention.
Figure 4:
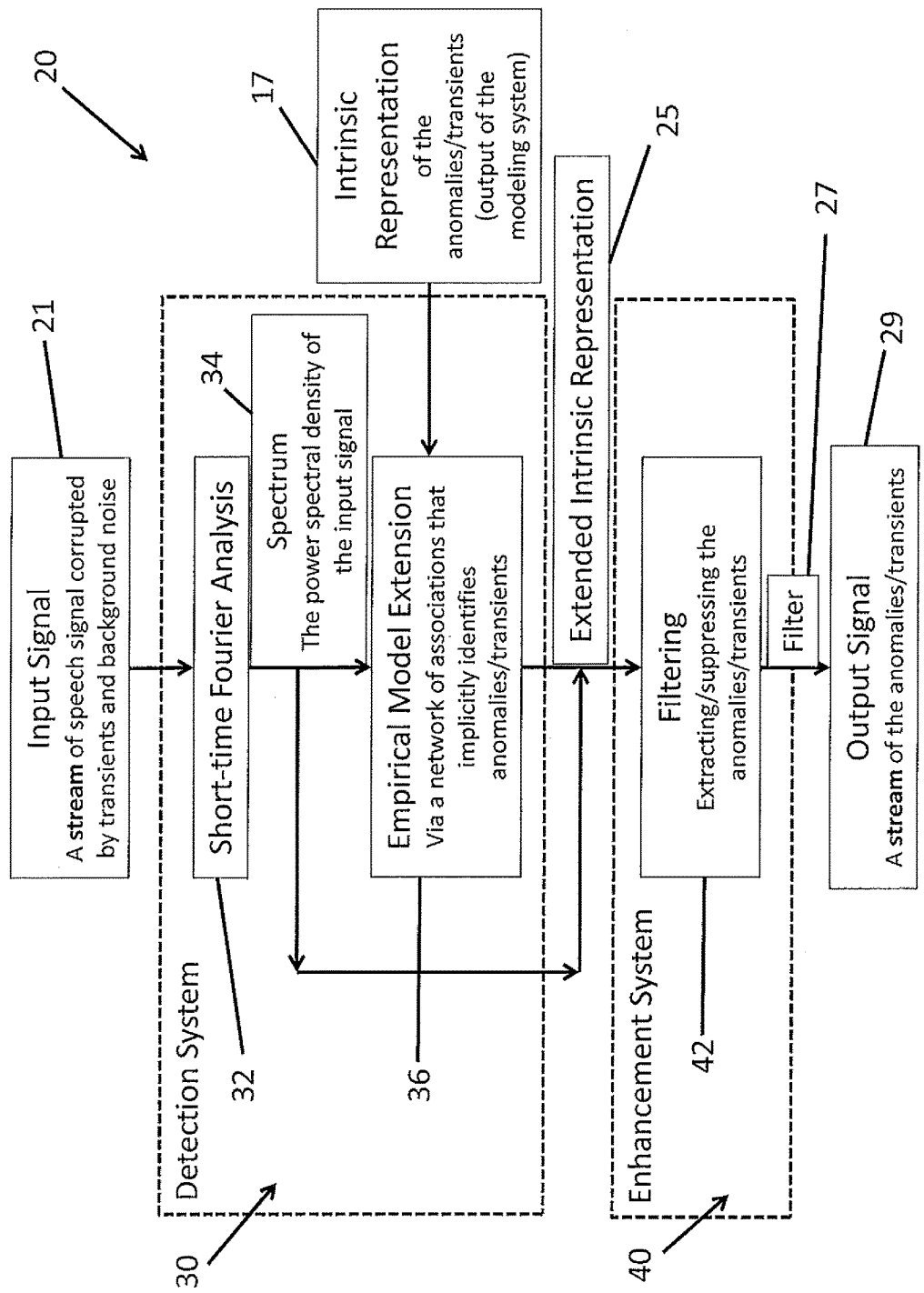
FIG. 4 is a flowchart of an exemplary embodiment of the test stage, comprising a detection system and an enhancement system, of the present invention.

The system of the present invention can generally be described as follows. The system comprises a training stage 10 (FIG. 3) and a test stage 20 (FIG. 4). Referring to FIG. 3, training stage 10 comprises a modeling system 12, wherein a modeling input signal 11, for example, speech corrupted by transients and background noise, enters a first signal processing unit 13 that applies short time Fourier analysis to modeling input signal 11. The output of signal processing unit 13 is the power spectral density 14 of the signal 11. The power spectral density 14 of the signal 11 enters a second signal processing unit 15 that builds an empirical model 17 via a network of associations that implicitly captures the structure of anomalies, for example, transients. The output of the modeling system 12 is empirical model 17, i.e. the intrinsic representation of anomalies.

The modeling system 12 of the present invention can build an intrinsic representation of anomalies, i.e. empirical model 17, without the need for any input other than the input signal 11. The empirical model 17 is initially obtained via a construction of a network of associations that relies on local model estimates without prior information. In other words, the modeling system 12 is capable of implicitly identifying anomalies that stand out from the input signal 11, and further provides an empirical model of these anomalies. For example, the modeling system can identify anomalies associated with keystrokes from a keyboard, without any extrinsic information, such as data from a computer operating system indicating that a keystroke has occurred. The modeling system can be efficiently implemented in real-time. Further, the model constructed by the modeling system for an initial input signal, i.e. the empirical model, may be applied to a different input signal. For example, the system of the present invention can suppress keyboard-typing transients associated with a different type of keyboard than the original keyboard associated with the signal used to build the empirical model.

Referring to FIG. 4, the test stage 20 of the present invention comprises a detection system 30, wherein a streaming signal 21, for example, speech corrupted by transients and background noise, enters a signal processing unit 32 that applies short time Fourier analysis to the signal 21. The output of signal processing unit 32 is the stream of power spectral density 34 of the signal 21. The stream of power spectral density 34 of the signal enters a signal processing unit 36 that is configured with the empirical model 17 from the output of the modeling system. This signal processing unit 36 extends the empirical model 17 to the incoming stream of data, i.e. streaming signal 21, via a network of associations that implicitly identifies anomalies, for example, transients. The output of the detection system 30 is the extended empirical model 25.

During the test stage 20 of the present invention, empirical model 17 may be transformed into extended empirical model 25 in an online, i.e. real-time fashion. New incoming data, i.e. data associated with streaming signal 21, can be sequentially added into the network of associations of the present invention based on a series of comparisons. Further, the empirical model 17 and/or extended empirical model 25 are suitable for filtering high-dimensional datasets because they reveal the underlying parameterization of data and enable a definition of intrinsic filters.

Referring again to FIG. 4, the system also comprises an enhancement subsystem 40, wherein a stream of power spectral density 34 of the signal and the extended empirical model 25 enter a signal processing unit 42. This signal processing unit 42 builds a filter 27 based on the extended empirical model 25 and applies it to the incoming stream of data, i.e. streaming signal 21. For example, such a filter 27 could be an enhancement filter that extracts or suppresses transients. The output of the system is a stream of filtered or enhanced signal 29.

The system of the present invention may comprise analog equipment for performing the single processing methods, or other methods of the present invention, described herein. In one embodiment, the system of the present invention may comprise computer software and computer hardware suitable for performing the methods described herein, as would be understood by a person of ordinary skill in the art.

The following formulations may be used to characterize the problem to which the system and method of the present invention may be applied.

Let x(n) denote a clean speech signal picked up with a single microphone. The observed signal y(n) is given by $$y(n)=x(n)+t(n)+u(n) \qquad (1)$$

where t(n) and u(n) are additive transient interference and stationary background noise, respectively, and n is the time index. The transient component t(n) may consist of one or multiple types of interferences.

Let Y(l,k) denote the short-time Fourier transform (STFT) of the microphone signal y(n) in time-frame l and frequency-bin k. Let N denote the number of nonnegative frequency bins corresponding to analysis and synthesis windows of length 2(N−1), and let R denote the time frame shift. Accordingly, equation (1) is represented in the STFT domain as $$Y(l,k)=X(l,k)+T(l,k)+U(l,k)$$

where X(l,k), T(l,k) and U(l,k) are the STFTs of x(n), t(n) and u(n), respectively.

Define $\lambda_y(l,k)=E[|Y(l,k)|^2]$ to be the short-time spectral variance of the measured signal. Assuming the speech, the transient interference, and the stationary noise are mutually uncorrelated, the spectral variance of the measurement is given by)

$$\lambda_y(l,k)=\lambda_x(l,k)+\lambda_t(l,k)+\lambda_u(l,k) \qquad (2)$$

where $\lambda_x(l,k)=E[|X(l,k)|^2]$, $\lambda_t(l,k)=E[|T(l,k)|^2]$, and $\lambda_u(l,k)=E[|U(l,k)|^2]$.

In one embodiment, the system and method of the present invention estimates the clean speech signal x(n) given the noisy measurements y(n). The processing of the measured signal is performed sequentially in the time-frequency domain. In order to exploit the spectral structure of the transients, the spectral features are collected from all the frequency bins of each time frame into vectors. Let $\lambda_y(l)$ be a vector of the spectral variance values of the measured signal corresponding to time frame l, defined by $$\lambda_y(l)=[\lambda_y(l,0),\ldots,\lambda_y(l,N-1)]^T \qquad (3)$$

and let $\lambda_t(l)$ be a vector of spectral variance values of the transient signal, defined similarly as $$\lambda_t(l)=[\lambda_t(l,0),\ldots,\lambda_t(l,N-1)]^T \qquad (4)$$

As contemplated herein, the system and method of the present invention estimates the spectral variance of the transient interference. Given a new time frame of measurements, the present invention estimates $\lambda_t(l)$ based on $\lambda_y(l)$. Then, the estimated spectrum is used for enhancing the speech.

In one embodiment, a training recording of a typical transient signal $\bar{t}(n)$ may be available in advance. In non-limiting manner and for purpose of clarity, all terms associated with a training recording are denoted with a bar. The recording comprises a collection of transient instances representing the various possible types, which are assumed to be known a-priori. The training recording is processed in the time-frequency domain using the STFT with the same analysis and synthesis windows and the same time shift. Let $\bar{\lambda}_t(l,k)$ be the spectral variance of the training recording, and let $\bar{M}$ be the number of available training time frames. Similarly to equations (3) and (4) we define $$\bar{\lambda}_t(l)=[\bar{\lambda}_t(l,0),\ldots,\bar{\lambda}_t(l,N-1)]^T \qquad (5)$$

Each of the vectors can be viewed as an N-dimensional point. Collecting all the vectors yields a set $\{\bar{\lambda}_t(\bar{l})\}_{\bar{l}}$ of $\overline{M}$ training points in an N-dimensional space.

Let $N_t$ be the number of transient types in the training recording, and let $\overline{T}_i$ be the set of training time frame indices containing the ith type. It is assumed that no more than a single transient exists in one time frame, which implies that $\overline{T}_i \cap \overline{T}_j = \emptyset$ for $i \neq j$. In addition, it is assumed that the duration of each transient event is shorter than a single short-time frame. Longer transient interferences are broken into separate sets and considered as few transient types. Each transient event consists of an abrupt sound followed by decaying oscillations. Unlike existing studies, where a transient is modeled as a composition of two parts—abrupt and decaying [9], the present invention treats each part independently, as a different type of transient. Let $\overline{T} = \overline{T}_1 \oplus \ldots \oplus \overline{T}_{N_t}$ denote the set of training time frames indices containing any transient interference. The remaining time frames of the training recording are considered silent.

Graph Construction

Defined herein is a non-symmetric kernel consisting of an affinity measure between the observed data points and the training points. Let M be the number of available observation time frames. The following derivation is extended to support sequential processing where the observations are not available in advance. Let W be an $M \times \overline{M}$ kernel matrix defined using a Gaussian as $$W_{l,\bar{l}} = \exp\left\{-\frac{\|\log(\lambda_y(l)) - \log(\bar{\lambda}_t(\bar{l})) - \eta\|^2}{2\sigma^2}\right\} \quad (6)$$

where $\sigma^2$ is the variance and $\eta$ is a constant vector. This is operated in the logarithmic domain because empirical experiments show better results than the linear domain. As in many speech processing applications in the logarithmic domain, small values are clipped. For simplicity, the clipping is omitted from the derivation.

The non-symmetric kernel defines a bipartite graph [20], where $\{\bar{\lambda}_t(\bar{l})\}_{\bar{l}}$ and $\{\lambda_y(l)\}_l$ are the two disjoint sets of nodes, and $W_{l,\bar{l}}$ determines the weight of the edge connecting $\lambda_y(l)$ and $\bar{\lambda}_t(\bar{l})$. The non-symmetric kernel is normalized to create a transition matrix of a Markovian process on the graph, i.e., $A = D^{-1}W$ with D a diagonal matrix defined by $D_{l,l} = \sum_{\bar{l}=1}^{\overline{M}} W_{l,\bar{l}}$. Accordingly, $A_{l,\bar{l}}$ is the transition probability in a single step from node $\lambda_y(l)$ to node $\bar{\lambda}_t(\bar{l})$.

Let $\overline{K}$ be a symmetric kernel of size $\overline{M} \times \overline{M}$ defined on the training nodes by $\overline{K} \triangleq A^T A$. According to the definition, each component of the symmetric kernel is given by $$\overline{K}_{\bar{l},\bar{l}'} = \sum_{l=1}^{M} A_{l,\bar{l}} A_{l,\bar{l}'}$$

Thus, $\overline{K}_{\bar{l},\bar{l}'}$ can be interpreted as an affinity metric between a training node $\bar{\lambda}_t(\bar{l})$ and a training node $\bar{\lambda}_t(\bar{l}')$ via any observable node $\lambda_y(l)$.

Similarly, K is a symmetric kernel of size M×M defined on the observed points by $K \triangleq AA^T$, i.e., $$K_{l,l'} = \sum_{\bar{l}=1}^{\overline{M}} A_{l,\bar{l}} A_{l',\bar{l}}$$

Then, $K_{l,l'}$ can be interpreted as an affinity metric between an observed node $\lambda_y(l)$ and an observed node $\lambda_y(l')$ via any training node $\bar{\lambda}_t(\bar{l})$. It further implies that two observations are similar if they "see" the training points in the same way.

Suppose that the transient part in the observation at time frame l equals to one of the training points, i.e., $\lambda_t(l) = \bar{\lambda}_t(\bar{l})$. By (2) we have $$\log(\lambda_y(l)) - \log(\bar{\lambda}_t(\bar{l})) = \log\left(1 + \frac{\lambda_x(l) + \lambda_u(l)}{\lambda_t(l)}\right) > 0.$$

It is demonstrated that the empirical probability density function of the right hand term has a single peak. It is observed that the peak (mean) is located remotely from zero, and the empirical probability density function is almost symmetric. Thus, the probability density function is approximated by a normal distribution with $\eta$ mean and $\sigma^2$ variance, such that the negative tail is negligible. The values of the mean and variance can then be determined according to the empirical mean and variance of the set $\{\log(\lambda_y(l)) - \log(\lambda_t(l))\}$. Accordingly, $$Pr(\log(\lambda_y(l)) | \lambda_t(l) = \bar{\lambda}_t(\bar{l})) = \quad (7)$$

$$\frac{1}{\sqrt{2\pi\sigma^2}} \exp\left\{-\frac{\|\log(\lambda_y(l)) - \log(\bar{\lambda}_t(\bar{l})) - \eta\|^2}{2\sigma^2}\right\}$$

It is assumed that the transient signal in the observation and the training transient signal have similar distributions. In addition, it is assumed that the spectral feature vector of the transient signal in each time frame can uniformly take one of a finite set of spectral feature vectors of cardinality $\gamma$ (as each transient type has a distinct characteristic structure), i.e., $Pr(\lambda_t(l) = \bar{\lambda}_t(\bar{l})) = 1/\gamma$. By the law of total probability the following is obtained $$Pr(\log(\lambda_y(l))) = \frac{1}{\gamma} \sum_{\overline{T}} Pr(\log(\lambda_y(l)) | \lambda_t(l) = \bar{\lambda}_t(\bar{l})) \quad (8)$$

Statistically independent frames neglecting potential frame overlap are assumed. This assumption is not respected in practice, especially since 75% overlapping frames are used. However, it enables a probabilistic interpretation of the kernel. The conditional joint probability of frames with the same transient component can be expressed similarly $$Pr(\log(\lambda_y(l)), \log(\lambda_y(l')) | \lambda_t(l) = \lambda_t(l')) = \quad (9)$$

$$\frac{1}{\gamma} \sum_{\overline{T}} Pr(\log(\lambda_y(l)), \log(\lambda_y(l')) | \lambda_t(l) = \lambda_t(l') = \bar{\lambda}_t(\bar{l})) =$$

$$\frac{1}{\gamma} \sum_{\overline{T}} Pr(\log(\lambda_y(l)) | \lambda_t(l) = \bar{\lambda}_t(\bar{l})) \times Pr(\log(\lambda_y(l')) | \lambda_t(l') = \bar{\lambda}_t(\bar{l})).$$

A significant benefit from this particular kernel is expressed by the following proposition (Proposition 1). Under the probabilistic assumptions (7) (8) (9), the elements of the kernel satisfy $$K_{l,l'} = Pr(\lambda_t(l) = \lambda_t(l') | \lambda_y(l), \lambda_y(l')).$$

By definition we have $$K_{l,l'} = (AA^T)_{l,l'} \qquad (23)$$
$$= \sum_{\tilde{l}} A_{l,\tilde{l}} A_{l',\tilde{l}}$$
$$= \sum_{\tilde{l}} \frac{W_{l,\tilde{l}}}{\sum_{\tilde{l}'} W_{l,\tilde{l}'}} \frac{W_{l',\tilde{l}}}{\sum_{\tilde{l}'} W_{l',\tilde{l}'}}$$
$$= \frac{\sum_{\tilde{l}} W_{l,\tilde{l}} W_{l',\tilde{l}}}{\sum_{\tilde{l}'} W_{l,\tilde{l}'} \sum_{\tilde{l}'} W_{l',\tilde{l}'}}$$

Substituting the non-symmetric affinity function (6) into (23) yields (24). Then, by the probability assumption (7) we have (25).

$$K_{l,l'} = \frac{\sum_{\tilde{l}} \exp\left\{-\frac{\|\log(\lambda_y(l)) - \log(\bar{\lambda}_t(\tilde{l})) - \eta\|^2}{2\sigma^2}\right\} \exp\left\{-\frac{\|\log(\lambda_y(l')) - \log(\bar{\lambda}_t(\tilde{l})) - \eta\|^2}{2\sigma^2}\right\}}{\sum_{\tilde{l}'} \exp\left\{-\frac{\|\log(\lambda_y(l)) - \log(\bar{\lambda}_t(\tilde{l}')) - \eta\|^2}{2\sigma^2}\right\} \sum_{\tilde{l}'} \exp\left\{-\frac{\|\log(\lambda_y(l')) - \log(\bar{\lambda}_t(\tilde{l}')) - \eta\|^2}{2\sigma^2}\right\}} \qquad (24)$$

$$K_{l,l'} = \frac{\sum_{\tilde{l}} Pr(\log(\lambda_y(l)) | \lambda_t(l) = \bar{\lambda}_t(\tilde{l})) Pr(\log(\lambda_y(l')) | \lambda_t(l') = \bar{\lambda}_t(\tilde{l}))}{\sum_{\tilde{l}'} Pr(\log(\lambda_y(l)) | \lambda_t(l) = \bar{\lambda}_t(\tilde{l}')) \sum_{\tilde{l}'} Pr(\log(\lambda_y(l')) | \lambda_t(l') = \bar{\lambda}_t(\tilde{l}'))} \qquad (25)$$

Substituting (8) and (9) into (25) yields $$K_{l,l'} = \frac{1}{\gamma} \frac{Pr(\log(\lambda_y(l)), \log(\lambda_y(l')) | \lambda_t(l) = \lambda_t(l'))}{Pr(\log(\lambda_y(l))) Pr(\log(\lambda_y(l')))}$$
$$= \frac{Pr(\log(\lambda_y(l)), \log(\lambda_y(l')) | \lambda_t(l) = \lambda_t(l'))}{Pr(\log(\lambda_y(l)), \log(\lambda_y(l')))} \times$$
$$Pr(\lambda_t(l) = \lambda_t(l')).$$

Finally, by Bayes' theorem we obtain $$K_{l,l'} = Pr(\lambda_t(l) = \lambda_t(l') | \lambda_y(l), \lambda_y(l')) \qquad (26)$$

This (Proposition 1) implies that the affinity metric defined by the kernel is the probability of comparing a pair of observable vectors with the same transient pattern. Accordingly, this kernel entails a comparison between the underlying spectral features of the transients "neutralizing" the speech and background noise. This way, the constructed graph may convey the desired transient interference spectral structure.

Graph-based Filter

Let $\{\mu_j, \psi_j\}_j$ be the eigenvalue decomposition of K, which satisfies $$K = \Psi \Lambda \Psi^T$$

with $$\Psi = [\psi_0 \ldots \psi_{M-1}] \qquad (10)$$

and $\Lambda$ is a diagonal matrix consisting of the eigenvalues in a descending order $\mu_0 \geq \mu_1 \geq \ldots > 0$. Each eigenvector $\psi_j$ is of length M and its lth coordinate parameterizes the lth time frame. By the orthogonality of the eigenvectors, the set $\{\psi_j\}_j$ forms a complete basis for any function $f: \Gamma \to \mathbb{R}$ with $\Gamma = \{\lambda_y(l)\}_l$. In particular, let $i_k: \Gamma \to \mathbb{R}$ be a function that retrieves the kth frequency bin from the spectral vector $\lambda_y(l)$, i.e., $i_k(\lambda_y(l)) = \lambda_y(l,k)$. It implies that each spectral component can be expanded according to the set of eigenvectors as $$\lambda_y(l,k) = i_k(\lambda_y(l)) = \sum_{j=0}^{M-1} \mu_j \langle i_k, \psi_j \rangle \psi_j(l)$$

where the inner product is defined as $$\langle i_k, \psi_j \rangle \triangleq \lambda_y^f(k) \psi_j \text{ with } \lambda_y^f(k) = [\lambda_y(1,k), \ldots, \lambda_y(M,k)].$$

The constructed graph captures the structure of the transients, characterized by a distinct spectral structure, by connecting similar spectral observations. Specifically, as implied above (Proposition 1), strong connections represent a high probability that the same transient pattern exits in the connected time frames. Consequently, there exists a subset of $\lambda$ eigenvectors which represents the transient interference. For simplicity, it is assumed that this subset consists of the dominant eigenvectors, i.e., $\{\psi_j\}_{j=0}^{\lambda}$. In some embodiments, the appropriate eigenvectors may be determined by observing their spectral structure.

The following graph-based filter that approximates the transient spectral component is defined by projecting the spectral variance of the observation onto the eigenvectors spanning the transient interference subspace $$\hat{\lambda}_t(l,k) = \sum_{j=0}^{\ell-1} \mu_j \langle i_k, \psi_j \rangle \psi_j(l) \qquad (11)$$

Let $\lambda_y$ be an M×N matrix where its (l,k)th element is defined as $\lambda_y(l,k)$. Then (11) can be re-written in a matrix form as $$\hat{\lambda}_t(l) = \lambda_y^T \sum_{j=0}^{\ell-1} \mu_j \psi_j(l) \psi_j \qquad (12)$$

Few speech "leftovers" may appear in the estimated spectral variance. Human speech consists of both harmonic and nonharmonic sounds and it can span across a wide range of frequencies. Thus, many speech phonemes can be represented (at least partially) by the transients "building blocks." Existence of such residuals in the spectral variance estimate of the transient signal degrades the quality of the speech when incorporated into an enhancement algorithm. Since the leftovers usually exist in periods where the transient signal is absent, the present invention is able to easily distinct them by their low magnitude compared to the magnitude of the transients. Thus, potential leftovers are removed by employing a hard threshold.

Speech Enhancement

To enhance the speech, the present invention employs the OM-LSA with a modified noise estimate. Let G(l,k) denote the spectral gain of the OM-LSA estimator given the noisy measurement Y(l,k). Thus, the speech estimate is given by $$\hat{X}(l,k) = G(l,k) Y(l,k)$$

In (Cohen and Berdugo, 2001, *Signal Processing*, 81:2403-2418), the optimal spectral gain with respect to the minimum log spectral amplitude (LSA) error criterion is controlled by the speech presence probability. Since it is unknown, the speech presence probability is estimated based on the time-frequency distribution of the a-priori signal-to-noise ratio (SNR), where the noise variance is estimated using the improved minima controlled recursive averaging (IMCRA) (Cohen, 2003, *IEEE Trans. Speech, Audio Process.*, 11(5): 466-475). Unfortunately, short and abrupt bursts of transient interferences are falsely detected as speech components. Hence, the transient interference is not a part of the noise PSD estimate obtained by the IMCRA approach, and as a result, is not attenuated. However, the present invention sets the optimal spectral gain to correspond to the sum of the spectral variance estimate of the transient interference $\hat{\lambda}_t(l,k)$ and the stationary noise $\hat{\lambda}_u(l,k)$. The former estimate is obtained by the graph-based filter (11) following the hard thresholding, and the latter estimate is obtained by the IMCRA. The IMCRA and the OM-LSA parameters used in this stage are similar to the set of parameters used to enhance speech and reduce stationary background noise as described in Cohen and Berdugo (Cohen and Berdugo, 2001, *Signal Processing*, 81:2403-2418).

Since the optimal spectral gain is controlled by the transient interference spectrum, the suppression of transients is now attainable. For more details regarding the optimal gain derivation and estimation of the speech presence probability and the noise spectrum, see Cohen and Berdugo (Cohen and Berdugo, 2001, *Signal Processing*, 81:2403-2418) and references therein. A Matlab code of the OM-LSA is also available online at http://webee.technion.ac.il/people/israelcohen/.

Transient Local Models and an Affinity Function

The estimation of the spectral variance of the transient interference is employed by the graph-based filter defined in (11). Thus, the estimation accuracy heavily depends on the ability of the graph to extract the structure of the spectral variance of the transients. As discussed herein and implied by (Proposition 1), the graph connects nodes with the same transient type. In order to enhance this property, a local data-driven model is defined for each transient interference type based on the training recording. It is assumed that the labeling of the transient recording $\{T_i\}_{i=1}^{N_t}$ is available. Let $\{\bar{\lambda}_t(l)\}_{l \in T_i}$ be the set of training spectral vectors corresponding to the ith transient type. We assume it consists of several transient events which define the variability of the transient type. Let $\bar{\eta}_i$ be the empirical mean vector of the set, i.e., $$\bar{\eta}_i = \frac{1}{|\mathcal{T}_i|} \sum_{l \in \mathcal{T}_i} \log(\bar{\lambda}_t(l))$$

and let $\bar{C}_i$ be the empirical covariance matrix of the set $$\bar{C}_i = \frac{1}{|\mathcal{T}_i|} \sum_{l \in \mathcal{T}_i} (\log(\bar{\lambda}_t(l)) - \bar{\eta}_i)(\log(\bar{\lambda}_t(l)) - \bar{\eta}_i)^T$$

where $|T_i|$ is the cardinality of the set $T_i$. The pair $(\bar{\eta}_i, \bar{C}_i)$ may be used as the learned model of the ith transient type. This assumption is supported by the fact that the logarithm has support for both negative and positive values. By employing principal component analysis (PCA), the large eigenvectors of $\bar{C}_i$, which correspond to the principal "parameters," capture most of the information disclosed in the data. Hence, the dimensionality is significantly reduced by considering only the subspace spanned by a few principal eigenvectors. Let $\{\bar{v}_{i,j}\}_{j=1}^{L}$ be the set of L such principal eigenvectors. A well-known limitation of PCA is that it is linear and able to capture only the global structure of the training data. The training set of transient instances admits a complicated global structure (often referred to as a non-linear manifold). Thus, a low-dimensional linear subspace may not faithfully describe the data in this setting. However, a PCA-based approach may perform rather well when applied locally, i.e., on a data set sufficiently condensed in a small neighborhood. In the present setting, this corresponds to defining a model for each transient interference type. Then, incorporating these local models in the graph provides integration of all the acquired models together.

$P_i$ is defined to be a linear projection operator of each spectral feature vector onto the local model of the ith transient type as $$P_i(\lambda_y(l)) = \bar{\eta}_i + \sum_{j=1}^{L} \langle \log(\lambda_y(l)) - \bar{\eta}_i, \bar{v}_{i,j} \rangle \bar{v}_{i,j} \qquad (13)$$

where the inner product is defined as $\langle \log(\lambda_y(l)) - \bar{\eta}_i, \bar{v}_{i,j} \rangle \triangleq (\log(\lambda_y(l)) - \bar{\eta}_i)^T \bar{v}_{i,j}$. The linear projection (13) can be used as a stand-alone estimator for the spectral variance of the transients. This provides information which may be incorporated into the graph construction. The graph provides integration of all transient instances and their local models together. Capitalizing the connections between the entire set of data, rather than using a single local model, attains significantly improved results.

Based on the projection, a pairwise metric between spectral feature vectors for each transient type is defined $$d_i(\lambda_y(l), \lambda_y(l')) = \|P_i(\lambda_y(l)) - P_i(\lambda_y(l'))\| \qquad (14)$$

The definition of the local metric (14) enables to adjust the kernel computation in (6). The affinity kernel can now be defined as $$W_{l,\tilde{l}} = \exp\left\{-\frac{\|\log(\lambda_y(l)) - \log(\bar{\lambda}_t(\tilde{l})) - \eta\|^2}{2\sigma^2}\right\} \times \exp\left\{-\frac{d_i^2(\lambda_y(l), \bar{\lambda}_t(\tilde{l}))}{2\tilde{\sigma}^2}\right\}. \qquad (15)$$

for $\tilde{l} \in T_i$ with scale $\tilde{\sigma}^2$ corresponding to the values of $d_i$. The first term ensures that the kernel is defined locally by comparing the spectral features of the vectors. The second term conveys the affinity of the observable vector to the training vector in terms of the ith transient interference type. Consequently, two vectors are similar if their underlying transient is similar and the observable speech component does not distort the transient significantly. The remainder of the graph construction, namely, the computation of the transition matrix A and the kernels $\bar{K}$ and K, remains unaltered. Compared to the kernel defined in (6), the new kernel enhances the connection between time frames that consist of transient events. Consequently, the spectral representation of the constructed graph better captures the transient structure, and the estimation of the transient spectral variance in (11) becomes more accurate. As demonstrated herein, experimental results show improved transient extraction and speech enhancement using the adjusted local kernel (15) compared with (6).

Implementation

First, the algebraic connection is drawn between the eigen-decomposition of the kernels K and $\overline{K}$.

(Proposition 2) The kernels K and $\overline{K}$ share the same eigenvalues $\mu_j$. The eigenvector $\psi_j$ of K corresponding to nonzero eigenvalues $\mu_j > 0$ satisfies $$\psi_j = \frac{1}{\sqrt{\mu_j}} A \varphi_j$$

where $\varphi_j$ is the eigenvector of $\overline{K}$ corresponding to eigenvalue $\mu_j$. In addition, the eigenvector sets $\{\varphi_j\}_j$ and $\{\psi_j\}_i$ are orthogonal.

By the definition of the kernels, namely $K = AA^T$ and $\overline{K} = A^T A$, the left singular vectors of A are the eigenvector $\psi_j$ of K, and the right singular vectors of A are the eigenvectors $\varphi_j$ of $\overline{K}$. The nonzero singular values of A are the square roots of the eigenvalues $\mu_j$ of either K or $\overline{K}$. According to the singular value decomposition, it implies that K and $\overline{K}$ share the same eigenvalues and the sets $\{\varphi_j\}_j$ and $\{\psi_j\}_j$ are orthogonal. Moreover, $$A \varphi_j = \sqrt{\mu_j} \psi_j$$

which yields $$\psi_j = \frac{1}{\sqrt{\mu_j}} A \varphi_j.$$

The main property emerged from this (Proposition 2) is the natural extension of the eigenvalue decomposition. Given a training recording and an initial observation interval, the matrix A and the kernel $\overline{K}$ can be constructed. Next, the singular value decomposition (SVD) of A is computed, which allows one to define the graph-based filter (11) used to estimate the spectral variance of a transient in the initial observation interval. Proposition 2 can then be applied to extend the spectral representation of the kernel matrix K, which defines the filter, to a new observation. The extension implied by Proposition 2 is efficiently computed and can be implemented in a sequential manner based on the spectral representation of $\overline{K}$ (which is computed in advance using the training data).

For each spectral feature vector $\lambda_y(l')$ corresponding to a new time frame observation l', one has by Proposition 2 that $$\psi_j(l') = \frac{1}{\sqrt{\mu_j}} a_{l'}^T \varphi_j \qquad (16)$$

where $a_{l'}$ is a vector of length $\overline{M}$ with elements given by $$a_{l'} = \frac{1}{d_{l'}} \exp\left\{-\frac{\|\log(\lambda_y(l')) - \log(\overline{\lambda}_t(\overline{l})) - \eta\|^2}{2\sigma^2}\right\} \times \qquad (17)$$

-continued $$\exp\left\{-\frac{d_t^2(\lambda_y(l'), \overline{\lambda}_t(\overline{l}))}{2\tilde{\sigma}^2}\right\}$$

and where $$d_{l'} = \sum_{\overline{l'}}^{\overline{M}} \exp$$

$$\left\{-\frac{\|\log(\lambda_y(l')) - \log(\overline{\lambda}_t(\overline{l})) - \eta\|^2}{2\sigma^2}\right\} \times \exp\left\{-\frac{d_t^2(\lambda_y(l'), \overline{\lambda}_t(\overline{l}))}{2\tilde{\sigma}^2}\right\}.$$

Then, the corresponding graph-based estimator based on the extended eigenvector is given by (12), i.e., $$\hat{\lambda}_t(l') = \lambda_y^T \sum_{j=0}^{\ell} \mu_j \psi_j(l') \psi_j. \qquad (18)$$

The sequential estimation of the spectral variance of the transient signal via the graph-based processing framework is summarized in Algorithm 1.

Algorithm 1: Graph-based Processing Algorithm

The Training stage may include the following steps:

Step 1: Obtain a training recording of typical transients and compute a training set $\{\overline{\lambda}_t(\overline{l})\}_{\overline{l}=1}^{\overline{M}}$ of $\overline{M}$ spectral variance feature vectors.

Step 2: Obtain an initial measurement and compute a set $\{\lambda_y(l)\}_{l=1}^{M}$ of M spectral variance feature vectors.

Step 3: Compute the non-symmetric kernel matrix W of size $M \times \overline{M}$ according to (15).

Step 4: Construct the transition matrix A of size $M \times \overline{M}$.

Step 5: Obtain the eigenvalue decomposition $\{\mu_j, \varphi_j\}_j$ and $\{\mu_j, \psi_j\}_i$ of $\overline{K}$ and K, respectively, by computing the SVD of A.

The Enhancement stage may include the following steps:

Step 1: Obtain a new time frame of the observable signal and compute the corresponding new feature vector $\lambda_y(l')$.

Step 2: Compute the affinity of the new observation vector to the training vectors according to (17).

Step 3: By Proposition 2, extend the eigenvectors to the new frame according to (16).

Step 4: Construct the graph-based filter corresponding to the new frame according to (18) using the extended vector. Obtain an estimate of the spectral variance for the transient interference $\hat{\lambda}_t(l')$.

Step 5: Compute the optimal gain of the OM-LSA based on $\hat{\lambda}_t(l')$ and employ it on the new time frame to enhance the speech.

Step 6: Return to Step 1 in the Enhancement stage.

Particular attention should be given to the efficiency and low computational complexity of the enhancement stage of each time frame. The following is a description of the naive computational cost (number of operations) for each step in the enhancement stage. Step 1 involves fast Fourier transform which yields O(N log N) operations. Computing the affinity between the new observation and the $\overline{M}$ training vectors in Step 2 yields O(N$\overline{M}$) operations, treating the number of principal local-model eigenvectors l as a constant. Accordingly, Step 3 costs O($\overline{M}$) operations. Finally, employing the graph-based filter in Step 4 requires O(M$\overline{M}$). By assuming that M, $\overline{M}$>N, we have a total computational burden of O(MM̄). We note that this cost is mainly due to a matrix multiplication, which can be implemented very efficiently.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

The performance of the proposed algorithm was evaluated on recorded speech and transient signals sampled at 16 KHz. Speech signals are taken from the TIMIT database (J. S. Garofolo, "DARPA TIMIT acoustic-phonetic continuous speech corpus cd-rom," National Inst. of Standards and Technology, Gaithersburg, Md., February 1993), and recorded transient interferences are taken from an online free corpus (http://www.freesound.org). The time domain measurements are constructed according to (1). The speech and transient interference were re-scaled to have equal maximal amplitude in the measured interval. The additive stationary noise part is a computer generated white Gaussian noise with SNR of 20 dB. Each measurement is 20 s long and consists of several speech utterances of 5 different speakers and 30 transient events. For the time-frequency representation, time frames of 512 samples length were used which correspond to N=257 positive frequency bins. In addition, a 75% overlap was used between successive frames.

The suppression of three transient interference signals were examined. The first transient interference is keyboard typing. A measurement interval containing 30 key strokes was enhanced with different amplitudes. The different key strokes are organized into three clusters of similar spectral structures. Based on a training recording of similar keyboard strokes, three transient models corresponding to the three key stroke types were trained as described previously. The second interference consists of three types of household knocks. One of the knocks has a relatively long duration, which exceeds a single time frame. Consequently, two models were attached to this interference type (one for the first abrupt part and one for the following decaying part) and another two models corresponding to the other two types of knocks, which results in four different models. The measurement signal consists of several different instances of each type with varying amplitudes. Finally, the third interference consists of three types of door knocks. Accordingly, three corresponding models were trained based on the training recordings. Similarly to the other transient interferences, the measurement consists of several different instances of these door knocks with varying amplitudes. It was noted that each training recording consisted of 10 instances of transients from each type. In addition, in order to represent the transients and define the graph-based filter (11) the principal l 20 eigenvectors of the graph was used. For each transient interference, the parameters (kernel scale) were empirically set, which yield maximum performance.

Figure 1B:
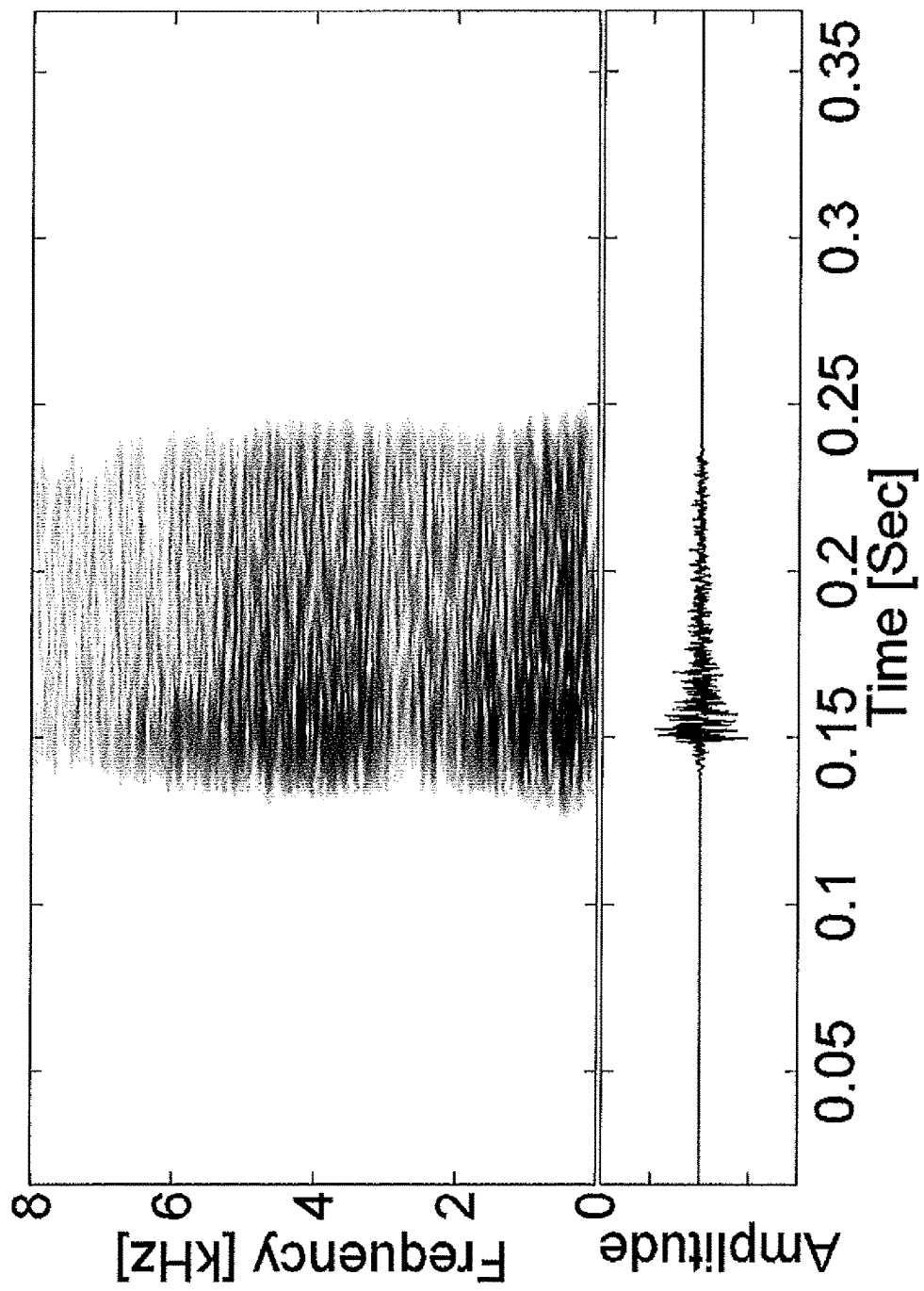
Figure 2A:
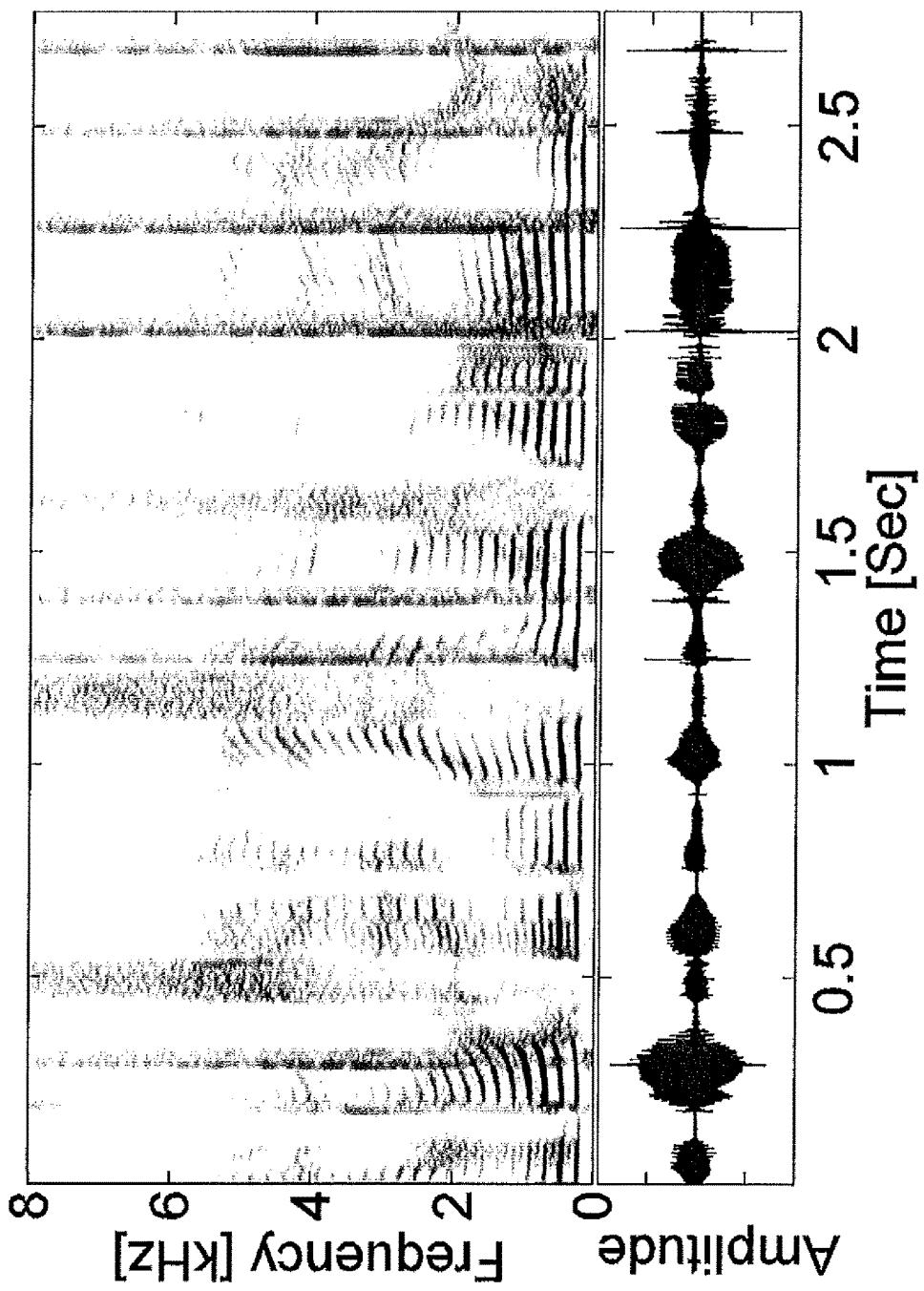
FIGS. 2A-2F, is a segment of the measurements and enhanced signals waveforms and spectrograms.
Figure 2B:
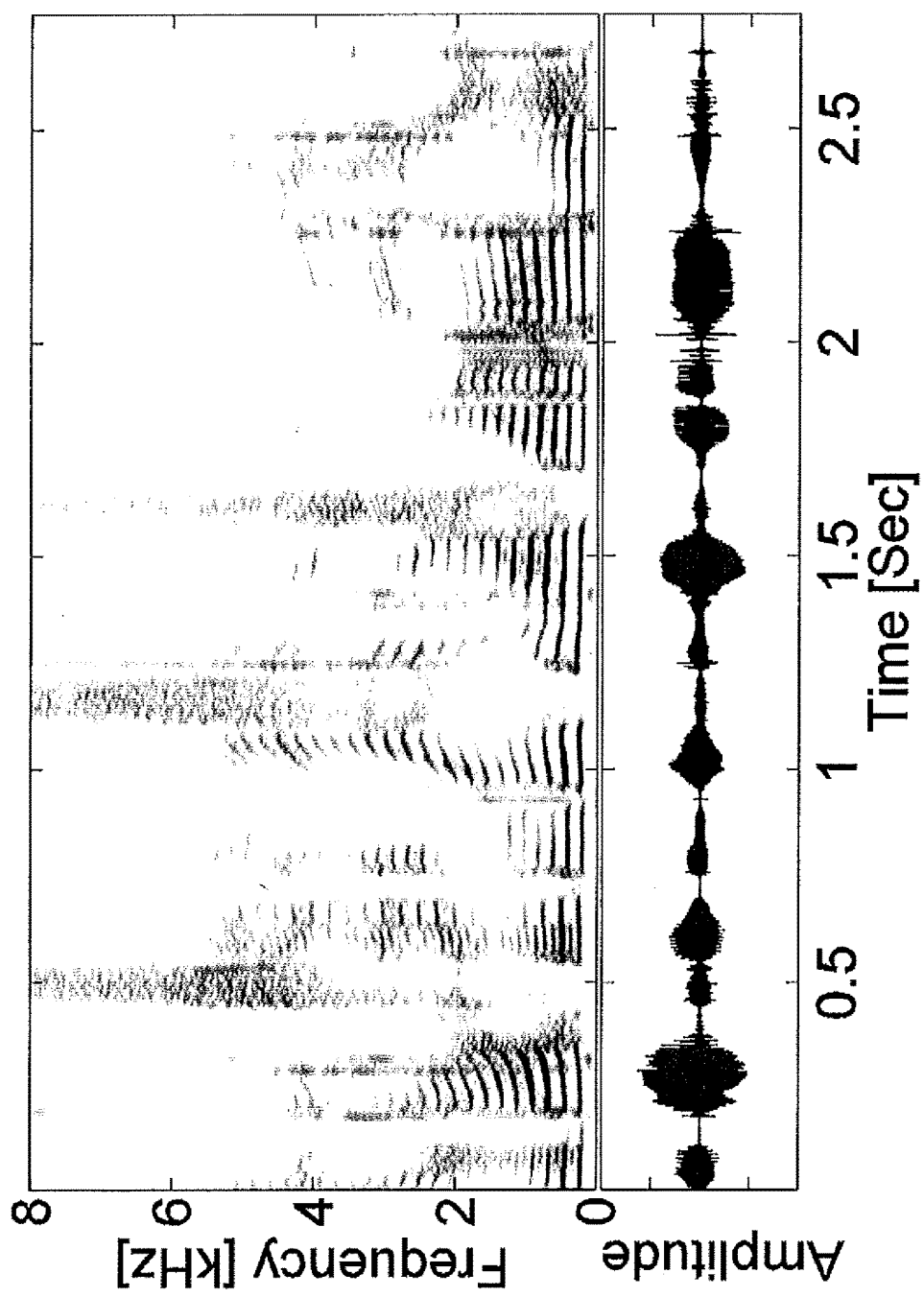
Figure 2C:
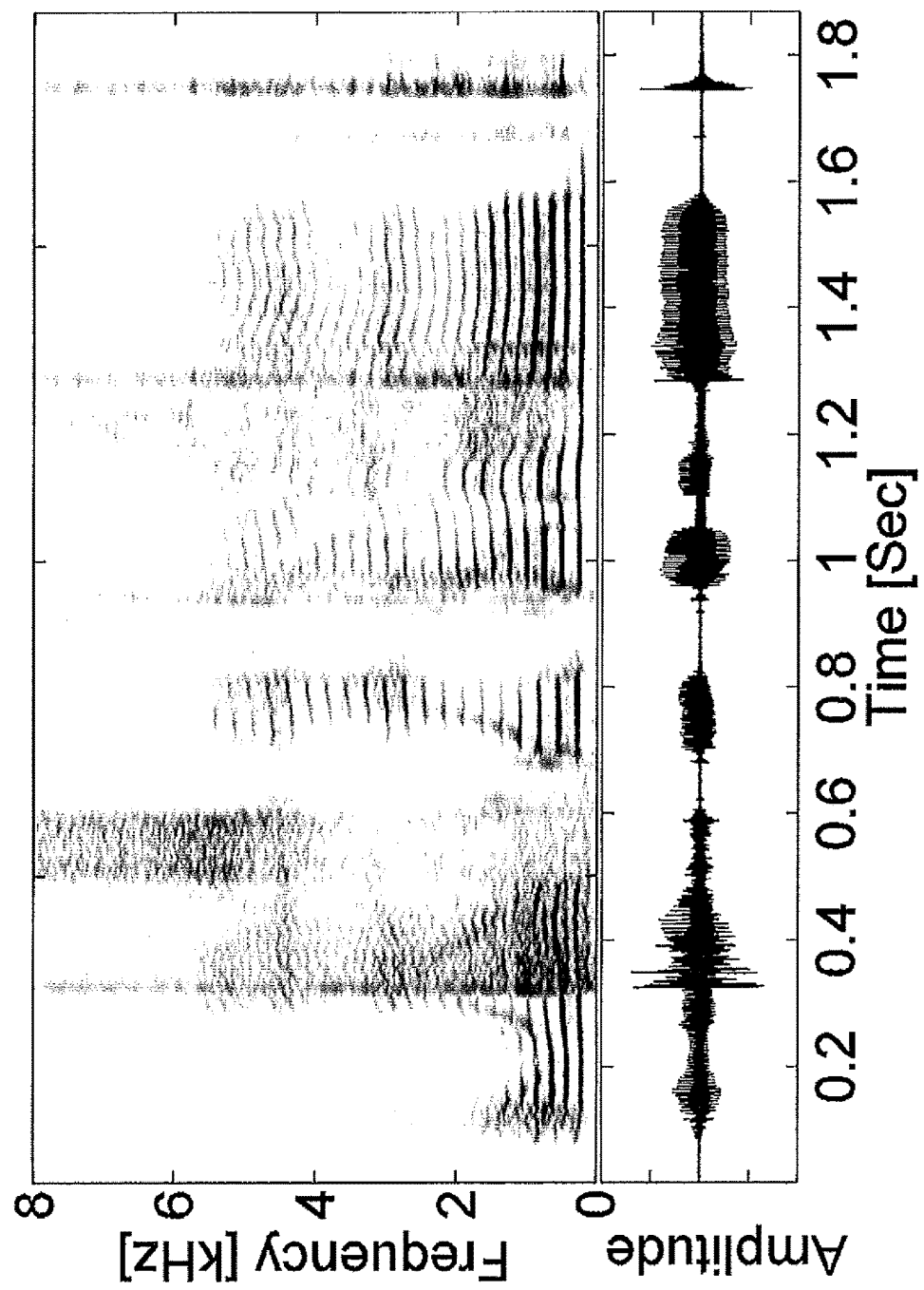
Figure 2D:
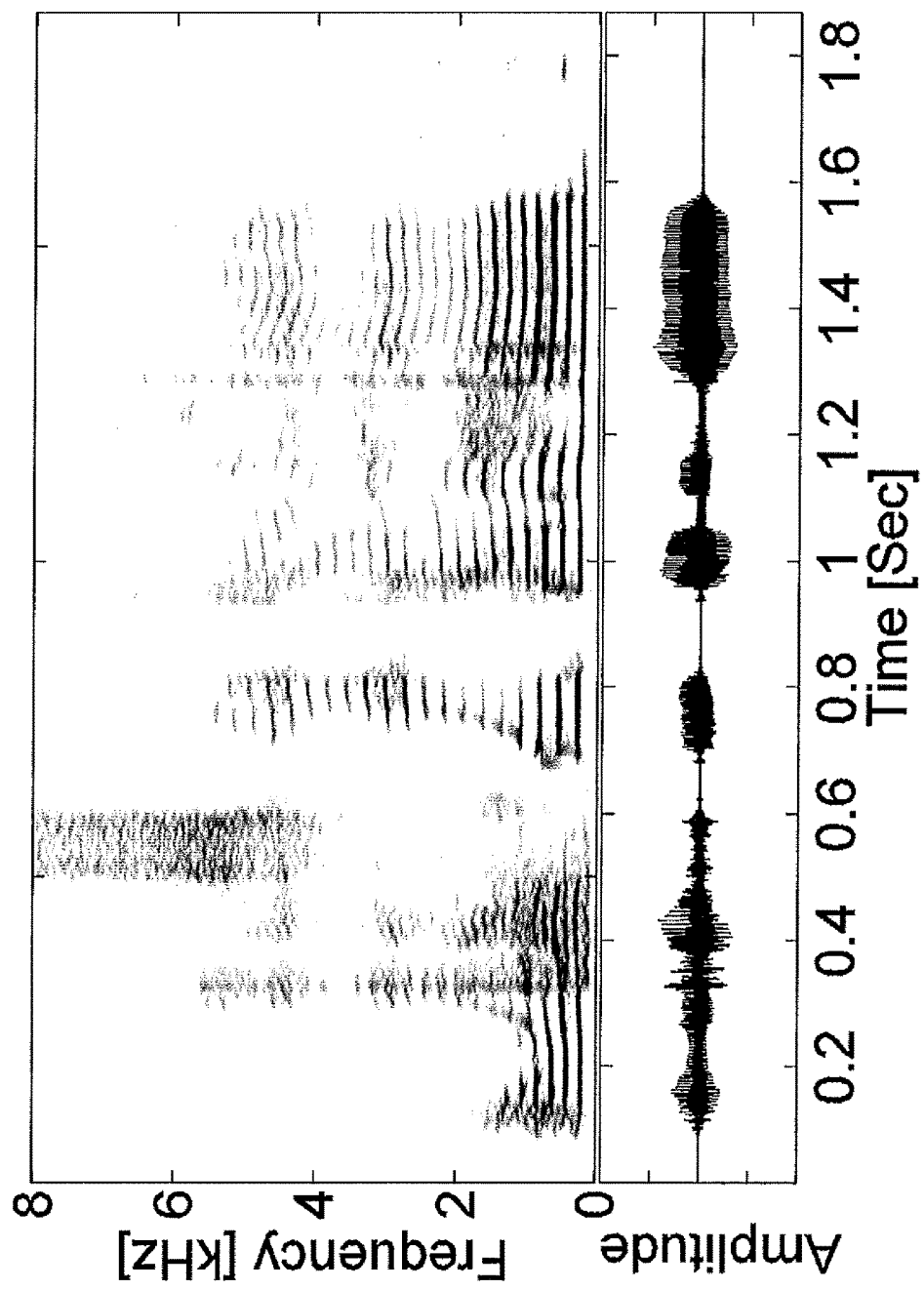
Figure 2E:
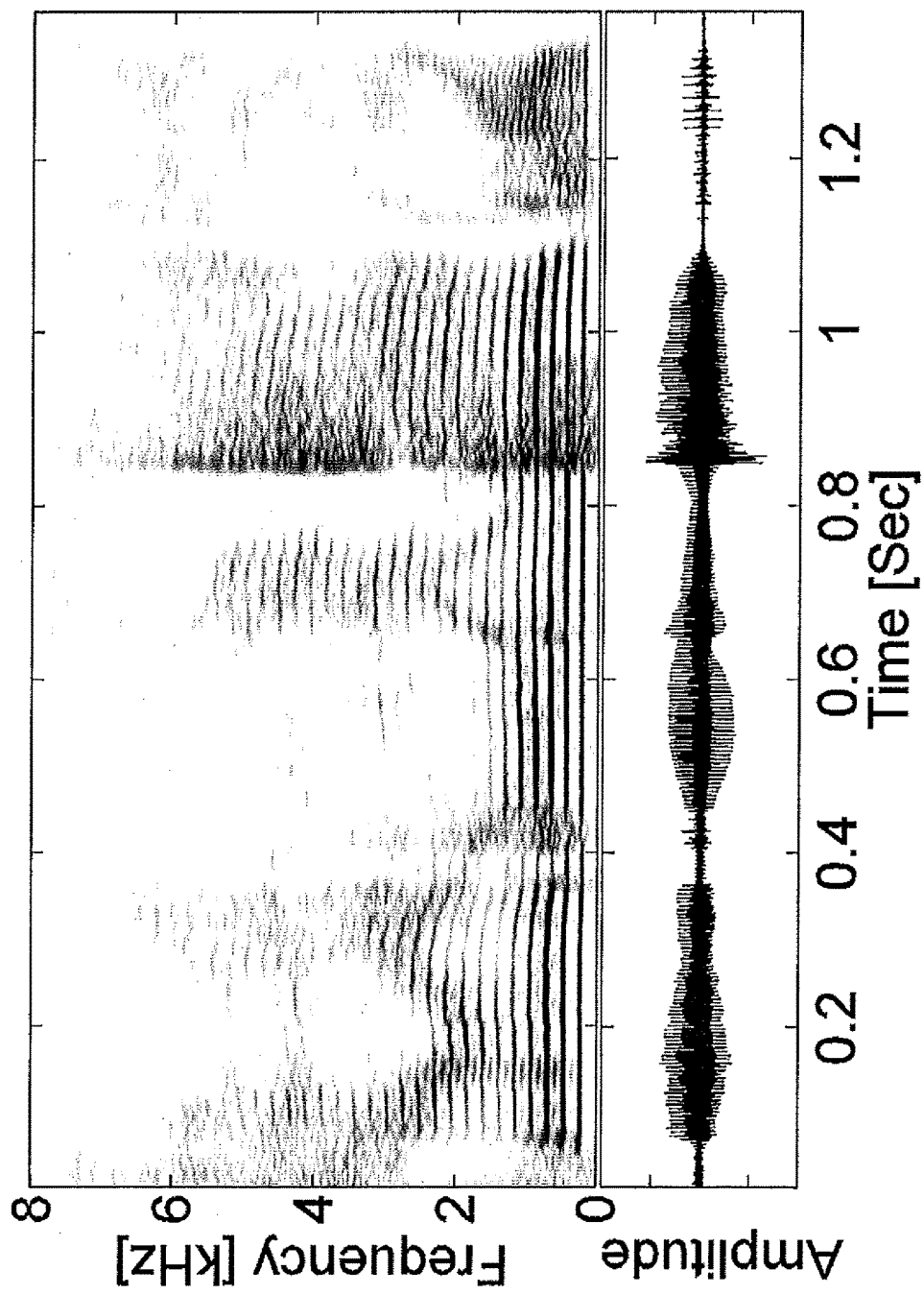
Figure 2F:
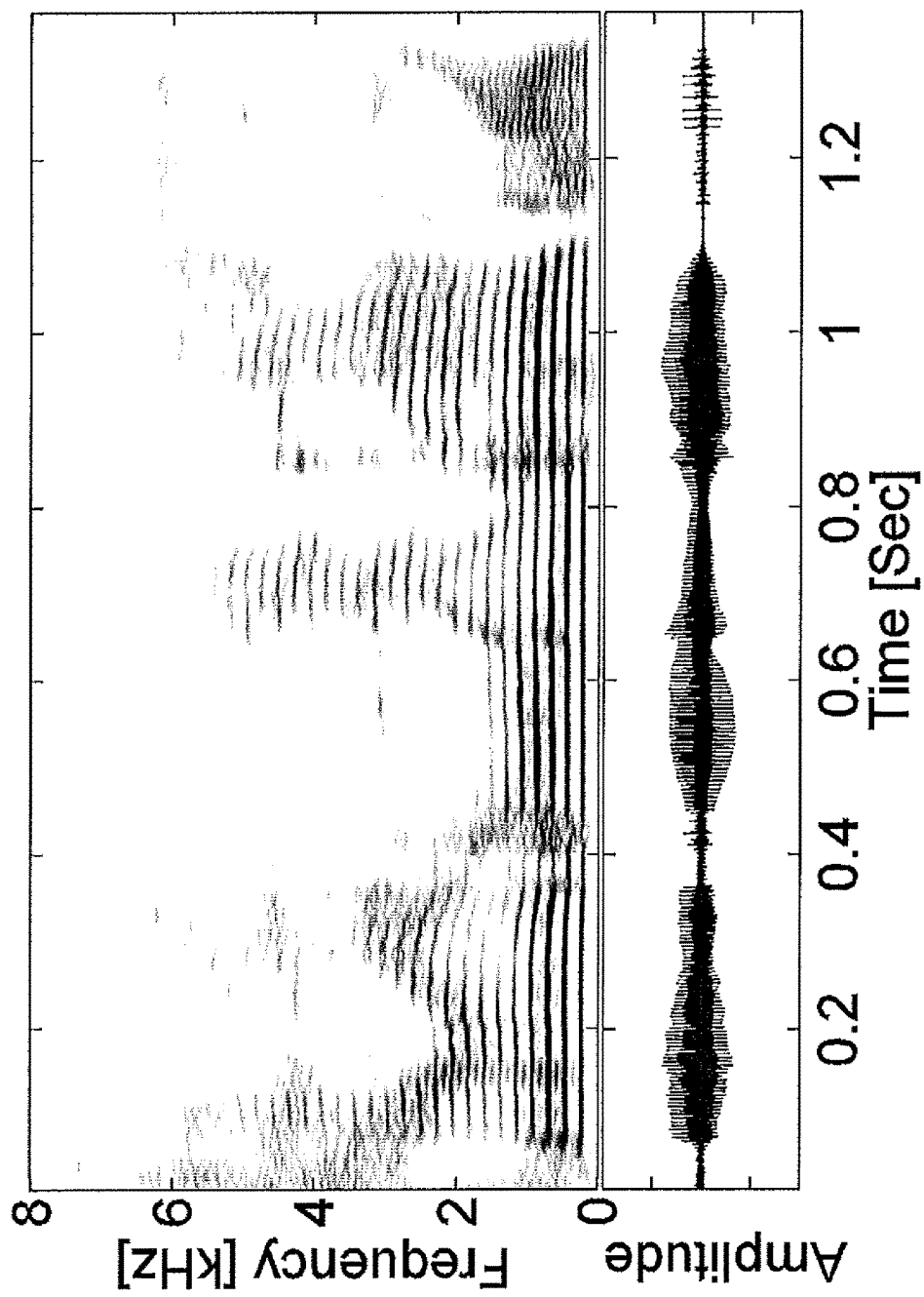

FIG. 1 shows an example for the transient spectral variance estimation. FIG. 1(a) presents the waveform and spectrogram of an instance of a door knock, and FIG. 1(b) presents the waveform and spectrogram of the transient instance estimate by the graph-based filter (11). Similar waveform and spectral features were observed. Particular attention should be given to the accurate estimate of the spectral "pattern" of the abrupt first part of the transient.

FIG. 2 depicts the waveforms and spectrograms of the measurements and enhanced signals. FIGS. 2(a), (c), and (e) show the noisy signals with keyboard typing, household interferences, and door knocks, respectively. FIGS. 2(b), (d), and (f) show the corresponding enhanced signals. It was observed that the proposed method attains significant transient interference reduction, while imposing very low distortion. Merely few transient residuals (e.g., near 1.3 s in FIG. 2(b)) appear in the enhanced signal. Furthermore, the waveforms of the enhanced signals suggest that the transient suppression does not leave "holes" in the signal, but rather maintains the speech component.

The performance of the present algorithm was compared to the algorithm proposed in Talmon et al. (Talmon, et al., 2011, *IEEE Trans. Audio, Speech Lang. Process.* 21(1):132-144). The present algorithm introduces two new aspects with respect to the previous work: learning transient models from training recordings and online processing, which are both incorporated into an integrated processing framework. It is noted that the online processing is obtained naturally given the trained models, since the employment of the models on the entire observation interval is equivalent to the employment of the models frame-by-frame. Thus, the comparison between the algorithms does not reflect the additional training stage of the proposed algorithm nor the advantage that the measurement is processed frame-by-frame. The online processing makes the present algorithm more adequate to communication applications. In addition, learning transient models in advance circumvents the requirement of the algorithm proposed in Talmon et al. (Talmon, et al., 2011, *IEEE Trans. Audio, Speech Lang. Process.* 21(1): 132-144) to have several instances of transients in order to properly capture the model from the measurements. In the following experiment better results are expected using the batch algorithm in case the observation interval contains several instances of transients with similar structure and amplitude. On the other hand, the graph-based algorithm is advantageous in case of multiple transient types and in case of high variability in the amplitudes of the transients.

The output of the algorithms was evaluated using two objective measures (S. R. Quachenbush, T. P. Barnwell III, and M. A. Clements, *Objective measures of speech quality*, Prentice Hall, 1988). The first is the common SNR, defined as $$SNR_{in} = 10\log_{10}\frac{\mathbb{E}\{x^2(n)\}}{\mathbb{E}\{(y(n)-x(n))^2\}} \qquad (19)$$

$$SNR_{out} = 10\log_{10}\frac{\mathbb{E}\{x^2(n)\}}{\mathbb{E}\{(\hat{x}(n)-x(n))^2\}}$$

The second is the mean log spectral distance (LSD) between the measured signal and the desired source, which is specifically adapted to speech signals and defined as $$LSD_{in} \overset{\Delta}{=} \mathbb{E}_l\left[\frac{1}{N}\sum_{k=0}^{N-1}|\ell(\lambda_x(l,k)) - \ell(\lambda_y(l,k))|^2\right]^{\frac{1}{2}} \quad (20)$$

$$LSD_{out} \overset{\Delta}{=} \mathbb{E}_l\left[\frac{1}{N}\sum_{k=0}^{N-1}|\ell(\lambda_x(l,k)) - \ell(\hat{\lambda}_x(l,k))|^2\right]^{\frac{1}{2}} \quad (21)$$

where $$\ell(\lambda) = \max\{10\log_{10}\lambda, \delta\} \quad (22)$$

and $\delta$ is a small value defined by $\delta = \max \lambda_r(l,k) - 50$, used to confine the dynamic range of the log-spectrum to 50 dB. These measures are computed only in time periods where the estimate of the PSD of transients exists. This allowed focus on the performance of the proposed algorithm and evaluate the speech enhancement and the artifacts introduced by the algorithm simultaneously. In periods where the transient estimate does not exit, only stationary noise suppression is attained, and the performance of the algorithm equals to the performance of the OM-LSA.

TABLE I

Speech Enhancement Evaluation

| Transient Type | SNR Improvement [dB] | | LSD Improvement [dB] | |
|---|---|---|---|---|
| | Batch Algorithm Proposed in [9] | Online Graph-based Filtering | Batch Algorithm Proposed in [9] | Online Graph-based Filtering |
| Keyboard Typing | 9.47 | 7.78 | 2.71 | 2.12 |
| Household Interferences | 5.20 | 6.62 | 1.83 | 2.04 |
| Door Knocks | 8.17 | 9.79 | 2.96 | 2.39 |

Table 1 summarizes the objective evaluation of the speech enhancement algorithms. Improvement in all tested cases was observed. For keyboard typing the batch algorithm indeed demonstrates better SNR and LSD improvements since it exploits the presence of similar keystrokes with similar amplitudes. For door knocks the present algorithm yields better SNR improvement whereas the batch algorithm yields better LSD improvement. The repeating door knocks in the observation interval have a similar structure which may be better exploited by the batch algorithm, however, the knocks have high amplitude variability which can be better handled by the graph-based algorithm. For household interferences the present online algorithm outperforms the batch algorithm. In this case the noisy signal consists of multiple types of interferences with various spectral structures and with both short- and long-durations. Thus, it demonstrates the robustness and flexibility of the present algorithm attained by training several interference models.

TABLE II

Perceptual Evaluation of Speech Quality (PESQ) Scores

| Transient Type | Noisy PESQ Scores | Batch Algorithm Proposed in [9] PESQ Scores Improvement | Online Graph-based Filtering PESQ Scores Improvement |
|---|---|---|---|
| Keyboard Typing | 2.165 | 0.601 | 0.749 |
| Household Interferences | 2.028 | 0.663 | 0.644 |
| Door Knocks | 1.933 | 0.593 | 0.536 |

Table II depicts the improvement of the perceptual evaluation of speech quality (PESQ) scores ("Perceptual evaluation of speech quality (pesq): An objective method for end-to-end speech quality assessment of narrow-band telephone networks and speech codecs," Tech. Rep. ITU-T P.862, 2001) with respect to the noisy signal. This measure cover a different aspect compared to Table I. It is noted that even a small increase in the PESQ score suggests noticeable improvement, as any sudden increase of power (e.g., attenuated transients) is audible. It was observed that the speech quality is improved in all tested cases in comparison with the noisy signal. In addition, the PESQ score improvement is larger when using the present algorithm compared to the algorithm in Talmon et al. (Talmon, et al., 2011, *IEEE Trans. Audio, Speech Lang. Process.* 21(1):132-144) in case of keyboard typing, whereas it is smaller in household interferences and door knocks. This trend complements the reported results in Table I. In general, it is noted that milder transient suppression (conveyed by lower SNR and LSD improvements) usually leads to smaller speech distortion (conveyed by higher PESQ values).

It is worthwhile noting that informal hearing tests confirm the objective measures and demonstrate significant reduction of the transient interference. In addition, the present algorithm was employed on noisy speech corrupted by keyboard typing recorded in a laptop. The obtained results are comparable to the reported results on the simulated data. Audio samples of the presented results are available online (http://users.math.yale.edu/rt294/).

The present algorithm results are achieved by online processing and demanding lower computational burden. In addition, the present algorithm does not introduce lag into the system. In practice, these properties make the present algorithm more suitable for real-time communication systems.

TABLE III

Speech Enhancement Evaluation in Multi-condition Case

| Transient Type | SNR Improvement [dB] | LSD Improvement [dB] | PESQ Score Improvement |
|---|---|---|---|
| Keyboard Typing | 7.46 | 2.04 | 0.597 |
| Household Interferences | 4.72 | 1.69 | 0.418 |
| Door Knocks | 8.75 | 1.81 | 0.528 |

In Tables I and II, the reported results correspond to a matched-condition setup, where each testing sample contains a certain type of transient, and the training data that is used for applying the algorithm to the testing sample contains exactly this type of transient. This scenario is suitable for applications in which the typical transients are known in advance, e.g., keyboard typing in phone- and conference call software. To further illustrate the applicability of the proposed algorithm under real-world conditions, the present algorithm was evaluated in a multi-condition training scenario. In this experiment, transients from all types are used for training a single model, which is then used to suppress all the test samples. For a fair comparison the testing stage was employed on the same noisy recordings as in the matched-condition experiment. Table III presents the SNR and LSD improvements and the PESQ score obtained under the multi-condition case. As expected in this challenging scenario, degradation in the transient suppression and speech quality compared to the matched-condition case in Tables I and II was observed. However, the suppression of the transients and the enhancement of the speech are significant and audible. This illustrates the ability of the present algorithm to train a generic single model consisting of a dictionary of a wide variety of transients, which can then be suppressed from real-world recording in various scenarios.

Accordingly, a system and method is presented for a supervised graph-based processing framework for sequential transient interference suppression. Based on training recordings, a graph that captures the intrinsic structure of the transients may be constructed. Then, by relying on the graph parameterization, a filter that extracts the transients from noisy speech measurements is defined. The application of the filter is shown to be efficient and adapted to online processing, by sequentially extending the graph parameterization to newly acquired observations. To capture the underlying structure of the transients, a suitable metric is defined based on local models computed from the training recordings. Experimental results show significant transient interference suppression and low speech distortion for various transient interference types.

The ability to capture the underlying structure of training recordings and then sequentially extracting it from noisy measurements provides efficient, generic, and robust processing framework. Given sufficient training recordings, this framework may handle a wider variety of interferences, and may be extended to other problems and applications.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A non-transitory computer-readable medium with instructions stored thereon, that when executed by a processor, suppresses transient interference from a signal, by performing the steps, comprising:
   obtaining a training recording of at least one transient;
   computing a training set $\{\bar{\lambda}_t(l)\}_{l=1}^{\bar{M}}$ of $\bar{M}$ spectral variance feature vectors;
   obtaining a recording of a signal and computing a set $\{\lambda_y(l)\}_{l=1}^{M}$ of M spectral variance feature vectors;
   building at least one local model for each transient type;
   modeling a structure of the at least one local model as a graph;
   defining a filter from the graph; and
   suppressing the transient from the signal by applying the filter;

wherein the at least one local model is built according to $$P_i(\lambda_y(l)) = \bar{\eta}_i + \sum_{j=1}^{L} \langle \log(\lambda_y(l)) - \bar{\eta}_i, \bar{v}_{i,j} \rangle \bar{v}_{i,j}; \quad (13)$$

wherein $\lambda_y(l)$ represents a vector of spectral variance values of the measured signal corresponding to timeframe l;
wherein $\bar{\eta}_i$ represents a constant vector;
wherein $\bar{v}_{i,j}$ represents a set of principal eigenvectors; and
wherein the signal is a signal type selected from a group consisting of audio, speech, diagnostics for machinery, and diagnostics based on medical time series or images.

2. The non-transitory computer-readable medium of claim 1, wherein the stored instructions further comprise the step of defining local filters from the at least one local model, wherein the local filters are defined according to $$d_i(\lambda_y(l), \lambda_y(l')) = \|P_i(\lambda_y(l)) - P_i(\lambda_y(l'))\| \quad (14);$$

wherein $P_i$ represents a linear projection of each spectral feature vector onto the local model of the ith transient type.

3. The non-transitory computer-readable medium of claim 2, wherein the stored instructions further comprise the step of computing a non-symmetric kernel matrix.

4. The non-transitory computer-readable medium of claim 3, wherein the non-symmetric kernel matrix is W of size M× $\bar{M}$ according to $$W_{l,\bar{l}} = \exp\left\{-\frac{\|\log(\lambda_y(l)) - \log(\bar{\lambda}_t(\bar{l})) - \eta\|^2}{2\sigma^2}\right\} \times \exp\left\{-\frac{d_i^2(\lambda_y(l), \bar{\lambda}_t(\bar{l}))}{2\tilde{\sigma}^2}\right\}; \quad (15)$$

wherein $\tilde{\sigma}^2$ represents a scale corresponding to the values of $d_i$;
wherein $\eta$ and $\sigma^2$ represent the mean and variance of a Gaussian approximation of the non-symmetric kernel matrix W; and
wherein $\bar{\lambda}_t(\bar{l})$ represents a vector of spectral variance values of the training recordings corresponding to timeframe $\bar{l}$.

5. The non-transitory computer-readable medium of claim 4, wherein the stored instructions further comprise the step of constructing a transition matrix.

6. The non-transitory computer-readable medium of claim 5, wherein the transition matrix is A of size M×$\bar{M}$.

7. The non-transitory computer-readable medium of claim 6, wherein the stored instructions further comprise the step of computing symmetric kernels $\bar{K}$ and K.

8. The non-transitory computer-readable medium of claim 7, wherein the stored instructions further comprise the step of obtaining the eigenvalue decomposition $\{\mu_j, \phi_j\}_j$ and $\{\mu_j, \psi_j\}_j$ kernels $\bar{K}$ and K, respectively, by computing the SVD of A.

9. The non-transitory computer-readable medium of claim 8, wherein the stored instructions further comprise the step of obtaining a new time frame of the observable signal and computing a corresponding new feature vector $\lambda_y(l')$.

10. The non-transitory computer-readable medium of claim 9, wherein the stored instructions further comprise the step of computing the affinity of the new observation vector to the training vectors according to $$a_{l'} = \frac{1}{d_{l'}} \exp\left\{-\frac{\|\log(\lambda_y(l')) - \log(\bar{\lambda}_t(\bar{l})) - \eta\|^2}{2\sigma^2}\right\} \times \exp\left\{-\frac{d_t^2(\lambda_y(l'), \bar{\lambda}_t(\bar{l}))}{2\tilde{\sigma}^2}\right\}. \quad (17)$$

11. The non-transitory computer-readable medium of claim 10, wherein the stored instructions further comprise the step of extending the eigenvectors to the new frame according to $$\psi_j(l') = \frac{1}{\sqrt{\mu_j}} a_{l'}^T \varphi_j. \quad (16)$$

12. The non-transitory computer-readable medium of claim 11, wherein the filter corresponds to the new frame according to a graph-based estimator defined by:

$$\hat{\lambda}_t(l') = \lambda_y^T \sum_{j=0}^{t} \mu_j \psi_j(l') \psi_j. \quad (18)$$

using the extended eigenvector.

13. The non-transitory computer-readable medium of claim 12, wherein the stored instructions further comprise the step of obtaining an estimate of the spectral variance for the transient interference $\hat{\lambda}_t(l')$.

14. The non-transitory computer-readable medium of claim 13, wherein the stored instructions further comprise the step of computing the optimal gain of the OM-LSA based on $\hat{\lambda}_t(l')$ and employing it on the new time frame to enhance the signal.

* * * * *